(12) United States Patent
Fukunaga

(10) Patent No.: US 11,099,985 B2
(45) Date of Patent: Aug. 24, 2021

(54) STORAGE CONTROLLER, STORAGE ARRAY DEVICE, DATA DEPOSITING METHOD, AND STORAGE MEDIUM

(71) Applicant: NEC Platforms, Ltd., Kawasaki (JP)

(72) Inventor: Toshinori Fukunaga, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 16/772,433

(22) PCT Filed: Dec. 17, 2018

(86) PCT No.: PCT/JP2018/046388
§ 371 (c)(1),
(2) Date: Jun. 12, 2020

(87) PCT Pub. No.: WO2019/124320
PCT Pub. Date: Jun. 27, 2019

(65) Prior Publication Data
US 2021/0073128 A1 Mar. 11, 2021

(30) Foreign Application Priority Data
Dec. 20, 2017 (JP) .............................. JP2017-244457

(51) Int. Cl.
G06F 12/0802 (2016.01)
G06F 3/06 (2006.01)

(52) U.S. Cl.
CPC ........ *G06F 12/0802* (2013.01); *G06F 3/0604* (2013.01); *G06F 3/0652* (2013.01);
(Continued)

(58) Field of Classification Search
CPC .. G06F 12/00; G06F 2212/7205; G06F 13/10; G06F 3/06; G06F 12/0802;
(Continued)

(56) References Cited

U.S. PATENT DOCUMENTS 5,623,701 A   4/1997 Bakke et al.
5,652,857 A   7/1997 Shimoi et al.
(Continued)

FOREIGN PATENT DOCUMENTS

JP    H07-129470 A    5/1995
JP    H08-328749 A    12/1996
(Continued)

OTHER PUBLICATIONS

International Search Report for PCT Application No. PCT/JP2018/046388, dated Mar. 5, 2019.
(Continued)

*Primary Examiner* — Hashem Farrokh

(74) *Attorney, Agent, or Firm* — Sughrue Mion, PLLC

(57) ABSTRACT

A storage controller, includes: at least one memory storing a set of instructions; and at least one processor configured to execute the set of instructions to: perform cache processing of storing, in a cache storage, data stored in a physical disk; specify a set of data that are adjacent to each other in a logical disk and are not adjacent to each other in the physical disk, among data stored in the cache storage, and set a group including the specified set of data; determine, at an opportunity in which all cached data among data belonging to the group become target data of deletion from the cache storage, a range in the physical disk in which the target data are stored in such a way that all data belonging to the group are continuously arranged in the physical disk; and write the target data into the determined range.

16 Claims, 22 Drawing Sheets

(52) U.S. Cl.
CPC .......... *G06F 3/0655* (2013.01); *G06F 3/0676* (2013.01); *G06F 3/0679* (2013.01); *G06F 2212/70* (2013.01); *G06F 2212/7205* (2013.01)

(58) Field of Classification Search
CPC .. G06F 2212/70; G06F 3/0604; G06F 3/0652; G06F 3/0655; G06F 3/0676; G06F 3/0679
USPC ....................................................... 711/118
See application file for complete search history.

(56) References Cited

U.S. PATENT DOCUMENTS

| | | | |
|---|---|---|---|
| 6,360,296 | B1 | 3/2002 | Kubota et al. |
| 8,145,865 | B1 * | 3/2012 | Longinov .......... G06F 11/2066 711/165 |
| 2013/0080724 | A1 | 3/2013 | Yamada et al. |
| 2015/0089132 | A1 * | 3/2015 | Madhusudana ....... G06F 3/0685 711/114 |
| 2015/0186048 | A1 * | 7/2015 | Kobashi ................ G06F 3/0656 711/112 |

FOREIGN PATENT DOCUMENTS

| | | |
|---|---|---|
| JP | 2000-285022 A | 10/2000 |
| JP | 2001-188658 A | 7/2001 |
| JP | 3419538 B2 | 6/2003 |
| JP | 3426385 B2 | 7/2003 |
| JP | 2013-073388 A | 4/2013 |
| JP | 2013-246646 A | 12/2013 |
| JP | 2015-125597 A | 7/2015 |

OTHER PUBLICATIONS

English translation of Written opinion for PCT Application No. PCT/JP2018/046388, dated Mar. 5, 2019.

* cited by examiner

Fig. 6

ADJACENT GROUP MANAGEMENT TABLE 530

530a

| ADJACENT GROUP NUMBER | LEADING PHYSICAL ADDRESS | BLOCK LENGTH | LEADING LOGICAL ADDRESS | LOGICAL RANGE (KB) |
|---|---|---|---|---|
| 0 | | | | |
| 1 | | | | |
| 2 | | | | |
| ... | ... | ... | ... | ... |

530b

| ADJACENT GROUP NUMBER | LEADING PHYSICAL ADDRESS | BLOCK LENGTH | LEADING LOGICAL ADDRESS | LOGICAL RANGE (KB) |
|---|---|---|---|---|
| 0 | 128 | 32 | 0 | 64 |
| 1 | | | | |
| 2 | | | | |
| ... | ... | ... | ... | ... |

Fig. 17

ADJACENT GROUP MANAGEMENT TABLE 530

530c

| ADJACENT GROUP NUMBER | LEADING PHYSICAL ADDRESS | BLOCK LENGTH | LEADING LOGICAL ADDRESS | LOGICAL RANGE (KB) |
|---|---|---|---|---|
| 0 | 128 | 32 | 0 | 64 |
| 1 | | | | |
| 2 | | | | |
| ... | ... | ... | ... | ... |

530d

| ADJACENT GROUP NUMBER | LEADING PHYSICAL ADDRESS | BLOCK LENGTH | LEADING LOGICAL ADDRESS | LOGICAL RANGE (KB) |
|---|---|---|---|---|
| 0 | 128 | 64 | 0 | 64 |
| 1 | | | | |
| 2 | | | | |
| ... | ... | ... | ... | ... |

Fig. 19 ARRANGEMENT OF DATA IN PHYSICAL DISK 800

STORAGE CONTROLLER, STORAGE ARRAY DEVICE, DATA DEPOSITING METHOD, AND STORAGE MEDIUM

This application is a National Stage Entry of PCT/JP2018/046388 filed on Dec. 17, 2018, which claims priority from Japanese Patent Application 2017-244457 filed on Dec. 20, 2017, the contents of all of which are incorporated herein by reference, in their entirety.

TECHNICAL FIELD

The present disclosure relates to a technique for reading and writing data with respect to a storage region.

BACKGROUND ART

An amount of handled data has been rapidly increasing with progression of a technique using various types of data. When a large capacity of data is handled, a technique for compressing data is useful. In a technique for storing compressed data in a storage device such as a disk, there is a technique of virtualizing a region in which data are stored, and performing an operation of data on, as a target, a logical disk being a virtual disk by a host device.

When data are stored into a real physical disk by write-back and the like, continuous data on the logical disk may be stored in a discrete manner on the physical disk. As updating is performed more frequently, a degree of discreteness becomes greater. When the degree of discreteness is great, time for reading data from the physical disk increases. As a result, an access speed decreases.

Several techniques for suppressing a decrease in access speed due to a discrete arrangement have been known. In a technique in PTL 1, when compressed data to be stored do not fit in a specific allocated region on a disk, an unused portion near the allocated region is searched, and a neighboring physical block is secured. The number of seek operations is suppressed by avoiding allocating compressed data to a physical block that is not neighboring, as much as possible. However, the technique in PTL 1 is not a technique for causing data stored once in a discrete manner to become continuous on a disk.

As a method of reducing a discrete arrangement of data, a method of performing sorting in such a way that data become continuous, which is called defragmentation, has been generally known, but general defragmentation requires time for execution. When defragmentation is performed particularly on frequently accessed data, access to the data during the defragmentation is limited, and thus overall access speed may decrease.

In addition, there are PTLs 2 and 3 as a document that discloses a technique for reducing a discrete arrangement of data.

In a technique in PTL 2, a plurality of compressed groups having a fixed size are defined. A step of rearranging compressed data in a compressed group in an ascending order of logical address and a step of allocating a data region to a compressed group are described. An exception region is allocated to compressed data having a size that exceeds a size of an original data region due to updating. PTL 2 also describes processing of correcting fragmentation of data caused by data being written to the exception region, but the processing is processing performed periodically and is processing similar to defragmentation.

In a technique in PTL 3, data are managed in a compressible unit, which is called as a segment. A disk control device in PTL 3 determines a physical address of compressed data by an algorithm in which an order between a logical address and a physical address seen from a host computer can be kept as much as possible.

The followings are documents that describe inventions partially related to the invention of the present application.

PTL 4 discloses a technique of collecting a plurality of pieces of compressed data and forming a compressed group having a fixed length. In this technique, a disk control device selects compressed data constituting a logical group in such a way as to generate a logical group of size having a certain logical sector size, and thus a disk usage rate is increased.

PTL 5 discloses a technique of sorting, when transmitting a copy of data to a storage device being a copy destination, data in such a way as to shorten a movement time of a magnetic head of a disk when the storage device records the copy in the disk, and then transmitting the data to the storage device.

PTL 6 discloses a technique of performing a read-ahead of compressed data that are likely to be a future processing target.

CITATION LIST

Patent Literature

[PTL 1] Japanese Patent No. 3419538
[PTL 2] Japanese Unexamined Patent Application Publication No. H8-328749
[PTL 3] Japanese Unexamined Patent Application Publication No. H7-129470
[PTL 4] Japanese Patent No. 3426385
[PTL 5] Japanese Unexamined Patent Application Publication No. 2013-073388
[PTL 6] Japanese Unexamined Patent Application Publication No. 2013-246646

SUMMARY OF INVENTION

Technical Problem

"Compressed group" in PTLs 2 and 4 and "segment" in PTL 3 are a group in which a total or a range of length of constituting data is fixedly determined in advance. However, there may be data varying in group but being highly related (being highly likely to be used simultaneously, for example). In the techniques described above, such highly related data are not necessarily stored continuously on a physical disk.

One of objects of the present invention is to provide a storage array device improving performance related to reading and writing of data.

Solution to Problem

A storage controller according to one aspect of the present invention includes: a cache processing means for performing cache processing of storing, in a cache storage unit, data stored in a physical disk; a setting means for specifying a set of pieces of data that are adjacent to each other in a logical disk and are not adjacent to each other in the physical disk, among data stored in the cache storage unit, and setting a group including the specified set of data; a determination means for determining, at an opportunity in which all cached data among data belonging to the group become a target to be deleted from the cache storage unit, a range in the physical disk in which data being the target to be deleted are stored in such a way that all data belonging to the group are continuously arranged in the physical disk; and a writing means for writing the data being the target to be deleted into the determined range.

A data storage method according to one aspect of the present invention includes: performing cache processing of storing, in a cache storage unit, data stored in a physical disk; specifying a set of pieces of data that are adjacent to each other in a logical disk and are not adjacent to each other in the physical disk, among data stored in the cache storage unit, and setting a group including the specified set of data; determining, at an opportunity in which all cached data among data belonging to the group become a target to be deleted from the cache storage unit, a range in the physical disk in which data being the target to be deleted are stored in such a way that all data belonging to the group are continuously arranged in the physical disk; and writing the data being the target to be deleted into the determined range.

A storage medium according to one aspect of the present invention stores a program causing a computer to execute: cache processing of storing, in a cache storage unit, data stored in a physical disk; setting processing of specifying a set of pieces of data that are adjacent to each other in a logical disk and are not adjacent to each other in the physical disk, among data stored in the cache storage unit, and setting a group including the specified set of data; determination processing of determining, at an opportunity in which all cached data among data belonging to the group become a target to be deleted from the cache storage unit, a range in the physical disk in which data being the target to be deleted are stored in such a way that all data belonging to the group are continuously arranged in the physical disk; and writing processing of writing the data being the target to be deleted into the determined range.

Advantageous Effects of Invention

According to the present invention, performance of a storage array device, related to reading and writing of data, is improved.

BRIEF DESCRIPTION OF DRAWINGS

FIG. 6 is a diagram illustrating an example of an adjacent group management table.

FIG. 17 is a diagram illustrating another example of the adjacent group management table.

EXAMPLE EMBODIMENT

Hereinafter, example embodiments according to the present invention will be described in detail with reference to drawings.

<<First Example Embodiment>>

First, a first example embodiment according to the present invention will be described.

<Configuration>

Figure 1:
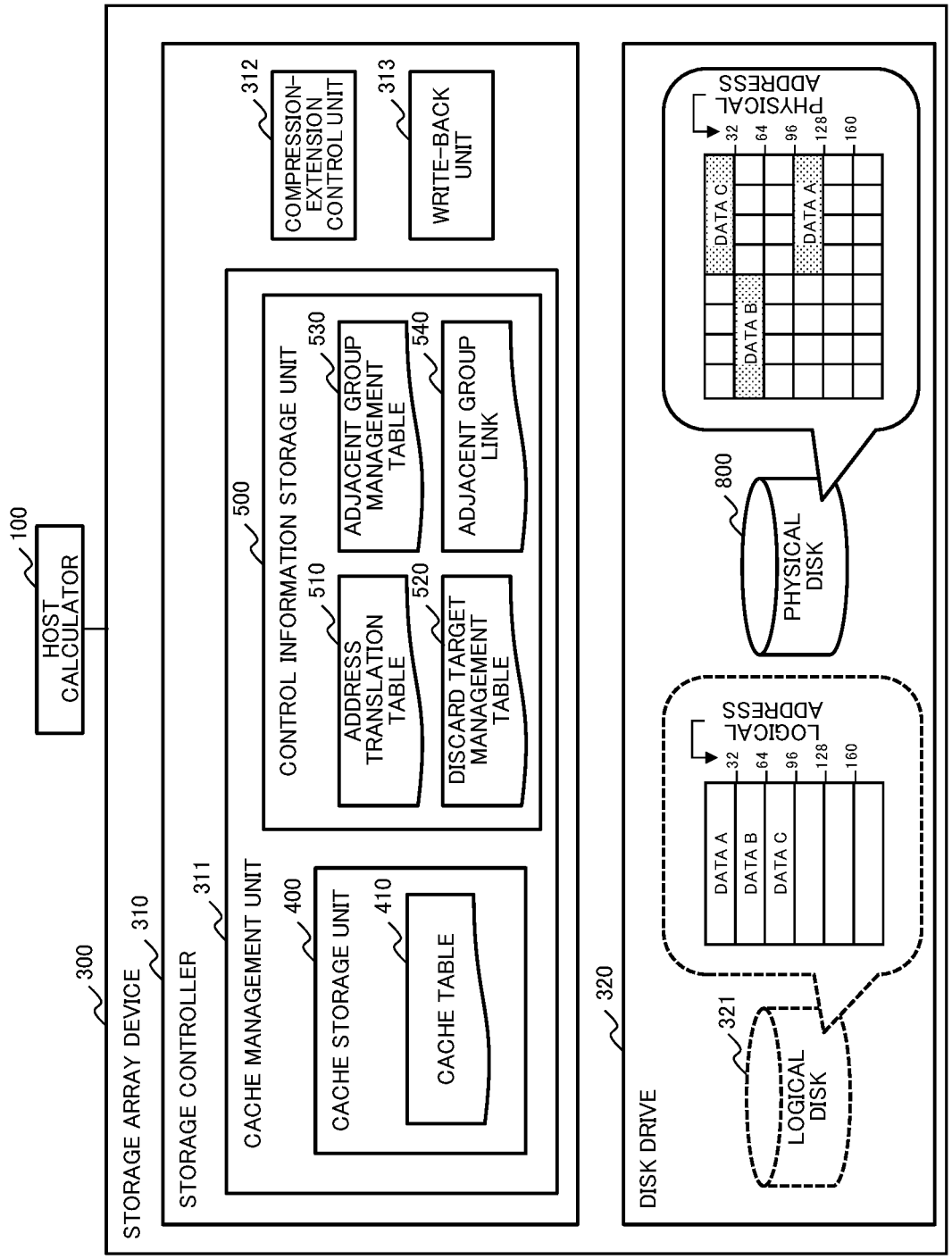
FIG. 1 is a block diagram illustrating a configuration of a storage array device according to a first example embodiment of the present invention.

FIG. 1 is a block diagram illustrating a configuration of a storage array device 300 according to the first example embodiment.

The storage array device 300 is configured in such a way as to be able to exchange a signal with a host calculator 100 through wired or wireless communication.

The storage array device 300 includes a storage controller 310 and a disk drive 320. The disk drive 320 stores data handled by the host calculator 100. The storage controller 310 performs reading and writing of data in the disk drive 320.

The disk drive 320 includes a physical disk 800 being an entity that stores data. The physical disk 800 is, for example, a hard disk drive (HDD). The physical disk 800 may be another storage device such as a solid state drive (SSD).

In FIG. 1, an example of an arrangement of data in the physical disk 800 is illustrated inside a balloon with a solid line. In the example illustrated in FIG. 1, one cell represents a region of 4 KB (kilobyte). For example, "data C" are stored in a region with numbers 16 to 31 in a physical address.

Further, in the disk drive 320, a logical disk 321 being a target on which an operation (read and write) on data is performed by the host calculator 100 is constructed. An example of an arrangement of data in the logical disk 321 is illustrated inside a balloon with a broken line in FIG. 1. For example, "data C" are data occupying a range with numbers 64 to 95 of a logical address in the logical disk.

The storage controller 310 includes a cache management unit 311, a compression-extension control unit 312, a write-back unit 313.

The compression-extension control unit 312 performs compression of data and extension (namely, restoration) of the compressed data. The compression-extension control unit 312 compresses data when storing the data in the disk drive 320. When the compression-extension control unit 312 caches data, that is, reads the data from the disk drive 320 and stores the data in a cache storage unit 400 (described below) of the cache management unit 311, the compression-extension control unit 312 extends the read data.

The write-back unit 313 performs processing of writing back data to a disk, namely, processing of storing, into the disk drive 320, data stored in the cache storage unit 400.

The cache management unit 311 manages cache data. The cache management unit 311 is broadly divided into the cache storage unit 400 and a control information storage unit 500.

The cache storage unit 400 stores cache data. The cache storage unit 400 manages the cache data by using a cache table 410. The cache table 410 stores, for example, the cache data, a page identifier (ID) being an ID for identifying each piece of the cache data, information about a logical address of the cache data, and a least recently used (LRU) bit. The LRU bit is information indicating that, as a number is smaller, the cache data provided with the LRU bit are data having a longer elapsed time since the cache data are used the last time.

The control information storage unit 500 stores information for performing control of processing related to caching of data and storage of data into the disk drive. The control information storage unit 500 holds an address translation table 510, a discard target management table 520, an adjacent group management table 530, and an adjacent group link 540. In the present example embodiment, the tables are described as separate tables, but one table may serve as a plurality of tables.

The address translation table 510 is a table that stores information representing a correspondence between a logical address and a physical address. A table 510a and a table 510b in FIG. 4 referred in the following description are an example of the address translation table 510.

The discard target management table 520 is a table that manages information about discard (namely, deletion from the cache storage unit 400) of cache data. Specifically, the discard target management table 520 stores, for each piece of cache data, information associated with a "discard target flag" indicating whether the cache data are a target of discard. In the description of the present disclosure, for example, when a value of the discard target flag is "1", it means that the cache data are a target of discard. A table 520a, a table 520b, and a table 520c in FIG. 5 referred in the following description are an example of the discard target management table 520.

The adjacent group management table 530 stores information about an adjacent group.

The adjacent group is a group of data set by the storage controller 310. A member of the adjacent group is compressed data or a grouping of data (hereinafter expressed as "compressed unit data") that may be compressed into one piece of compressed data. Hereinafter, data constituting the adjacent group is also expressed as "data belonging to the adjacent group". Note that, since the adjacent group is a concept, whether the data belonging to the adjacent group are in a state of being compressed or extended is unquestioned when the adjacent group is mentioned.

As in a table 530a and a table 530b in FIG. 6, the adjacent group management table 530 stores, for each set adjacent group, information indicating an adjacent group number being a number for identifying an adjacent group, a leading physical address being a start position in a physical address, a block length indicating a length of a storage range in the physical disk 800, a leading logical address being a start position in a logical address, and a logical range being a length in the logical disk.

The adjacent group link 540 stores information indicating a relationship between an adjacent group and cache data. A table 540a and a table 540b in FIG. 7 referred in the following description are an example of the adjacent group link 540. In the adjacent group link 540, a page ID of cached data is associated with an adjacent group number of an adjacent group to which the data belong. Note that, hereinafter, data being associated with an adjacent group number in the adjacent group link 540 are particularly referred to as "data being associated with an adjacent group".

Further, the adjacent group link 540 stores a value of a storage flag for each adjacent group. The storage flag is a two-valued variable, and takes a value of "0" or "1", for example. In the description of the present disclosure, a storage flag being "1" means that data associated with an adjacent group provided with the storage flag are stored into the physical disk when being discarded from the cache storage unit 400.

<Operation>

Hereinafter, an operation of the storage array device 300 will be described.

Figure 2:
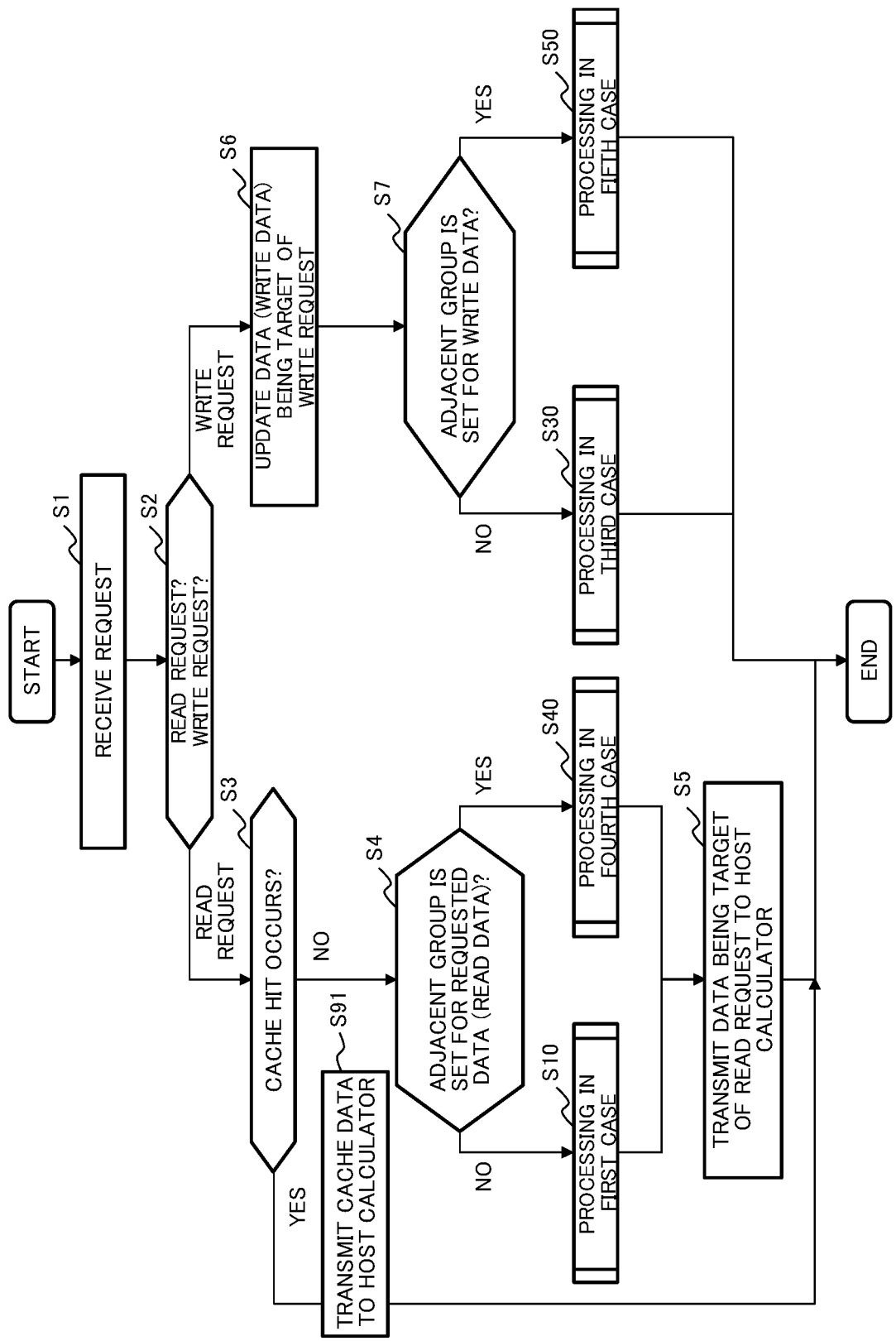
FIG. 2 is a flowchart illustrating an outline of a flow of processing of the storage array device according to the first example embodiment.

FIG. 2 is a flowchart illustrating a flow of the operation of the storage array device 300 that starts when the host calculator 100 transmits a read request or a write request to the storage array device 300.

When the storage array device 300 receives a request from the host calculator 100 (step S1), the storage array device 300 performs processing varying depending on whether the received request is a read request or a write request. Note that the read request is a request for reading data, and the write request is a request for writing data (that is, for updating data in a target range).

When the received request is the read request ("read request" in step S2), the storage array device 300 checks whether a cache hit occurs (step S3). The cache hit means that data being a target of the read request are found from the cache storage unit 400. When the cache hit occurs (YES in step S3), the storage controller 310 may read cache data associated with the data being the target of the read request from the cache storage unit 400, and transmit the cache data to the host calculator 100 (step S91). In this case, the storage array device 300 terminates the processing with respect to the request by the processing in step S91.

When the cache hit does not occur (NO in step S3), the storage controller 310 checks whether an adjacent group is set for compressed unit data (hereinafter "read data") including the data being the target of the read request (that is, whether the read data belong to any adjacent group). Specifically, the storage controller 310 may refer to the adjacent group management table 530, and check whether a range of a logical address of the read data is included in any range of existing adjacent groups. When the adjacent group is not set for the read data (NO in step S4), the storage controller 310 performs processing in a first case (step S10). When the adjacent group is set for the read data (YES in step S4), the storage controller 310 performs processing in a fourth case (step S40).

When the processing in the first case or the processing in the fourth case is performed, the storage controller 310 transmits the data being the target of the read request to the host calculator 100 as a response to the request from the host calculator 100 (step S5). Note that the storage controller 310 may perform the processing in step S5 during the processing in the first case or the processing in the fourth case.

When the received request is the write request ("write request" in step S2), the storage controller 310 updates data in a target range of the write request according to the write request (step S6). When the data in the target range of the write request are already in the cache storage unit 400 as cache data, the storage controller 310 may update the cache data. When a target of the write request is a part of a range of compressed data stored in the physical disk 800 in a case where the data in the target range of the write request are not in the cache storage unit 400, the storage controller 310 caches the compressed data from the physical disk 800, and then updates the target range of the write request in the cached data. When a target of the write request is the whole of compressed data stored in the physical disk 800, the storage controller 310 may only record data requested of writing by the write request in the cache storage unit 400 without caching the compressed data from the physical disk 800.

Hereinafter, the compressed unit data including the range updated by write data are expressed as "write data".

Next, the storage controller 310 checks whether an adjacent group is set for the write data (step S7). When the adjacent group is not set for the write data (NO in step S7), the storage controller 310 performs processing in a third case (step S30). When the adjacent group is set for the write data (YES in step S7), the storage controller 310 performs processing in a fifth case (step S50).

Hereinafter, the processing in the first case to the processing in the fifth case will be described in detail. Note that processing in a second case is processing in a case where a need for discard of a cache occurs.

[[Processing in First Case]]

The first case is a case where the storage array device 300 receives the read request for a part or the whole of data that do not belong to any adjacent group.

In the following description, the cache table 410, the address translation table 510, the discard target management table 520, the adjacent group management table 530, the adjacent group link 540, and an arrangement of data in the physical disk 800 are respectively illustrated in FIGS. 3 to 8.

The following situation is assumed as an example (hereinafter also referred to as a "first situation example") of a situation immediately before the first case occurs. Compressed data "A", "B", and "C" are stored in the physical disk 800 (arrangement example 800a in FIG. 8). The compressed data "A", "B", and "C" are data in a state where compressed unit data "A", "B, and "C" being a grouping of data that may be compressed into one piece of compressed data are respectively compressed. In the following description, the compressed data "A" and the compressed unit data "A" are referred to as data "A" without distinction. The same also applies to data "B" and data "C". The data "A", "B", and "C" are stored in a state of being compressed at a compression rate of 50% in the physical disk 800. The symbols "A", "B", and "C" provided to the data are symbols provided for description. The storage array device 300 may only be able to recognize a range of each grouping of compressed data, and may not necessarily identify the data by a name.

Figure 8:
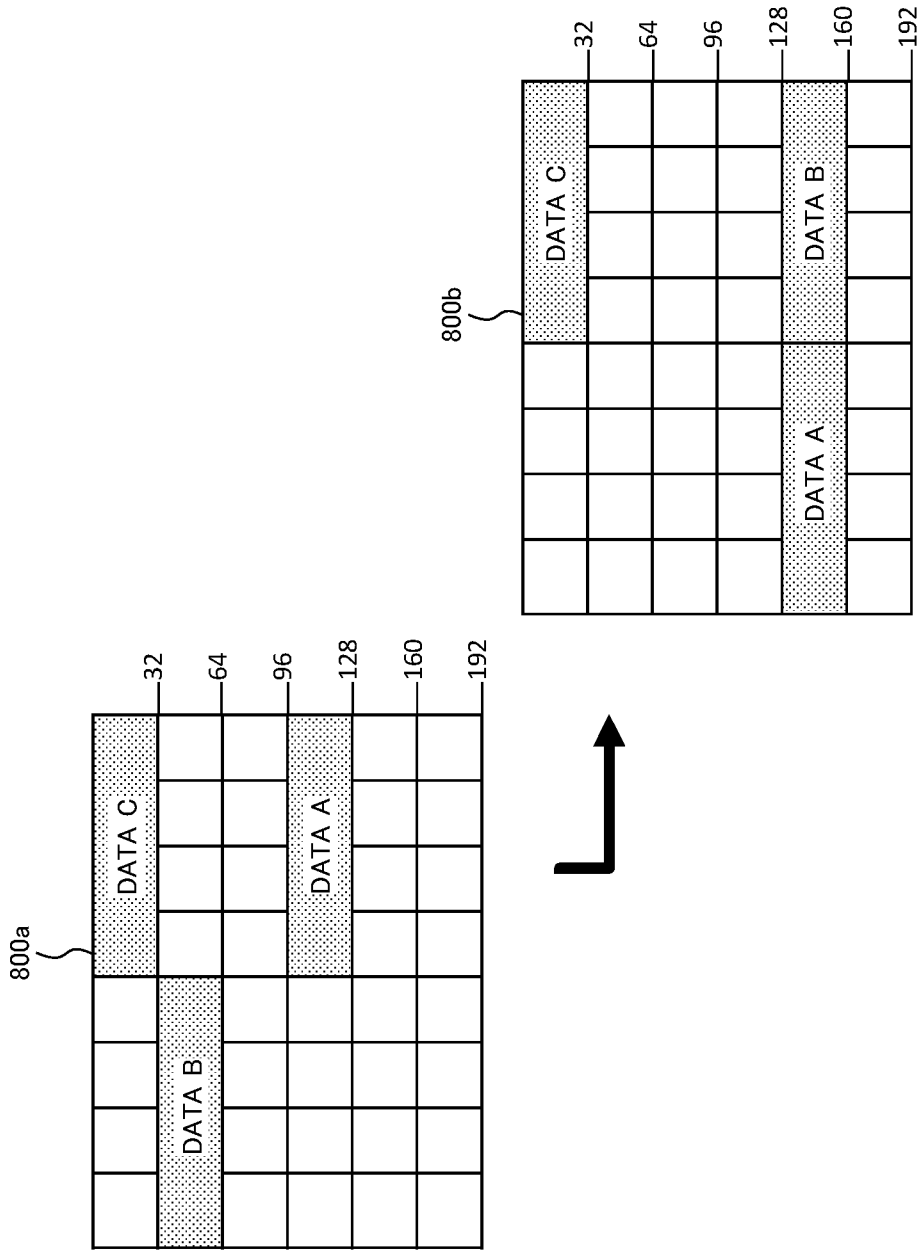
FIG. 8 is a diagram illustrating an example of an arrangement of data in a physical disk.

In the physical disk 800, the data "A" and the data "B" are located at a distance from each other as in the arrangement example 800a in FIG. 8. On the other hand, it is assumed that a range of an address of the data "A" is 0 to 31, a range of an address of the data "B" is 32 to 63, and a range of an address of the data "C" is 64 to 95 in the logical disk 321. In the address translation table 510, information related to a range of a logical address and a range of a physical address of the data "A", "B", and "C" is stored (table 510a in FIG. 4). However, although "data name" is indicated for the convenience of description of the present example embodiment, the address translation table 510 may not need to actually include the information about "data name". Further, "storage block number" in the address translation table 510 is information representing a length of a range in which data are stored with 4 KB as a unit in the physical disk 800.

Figure 3:
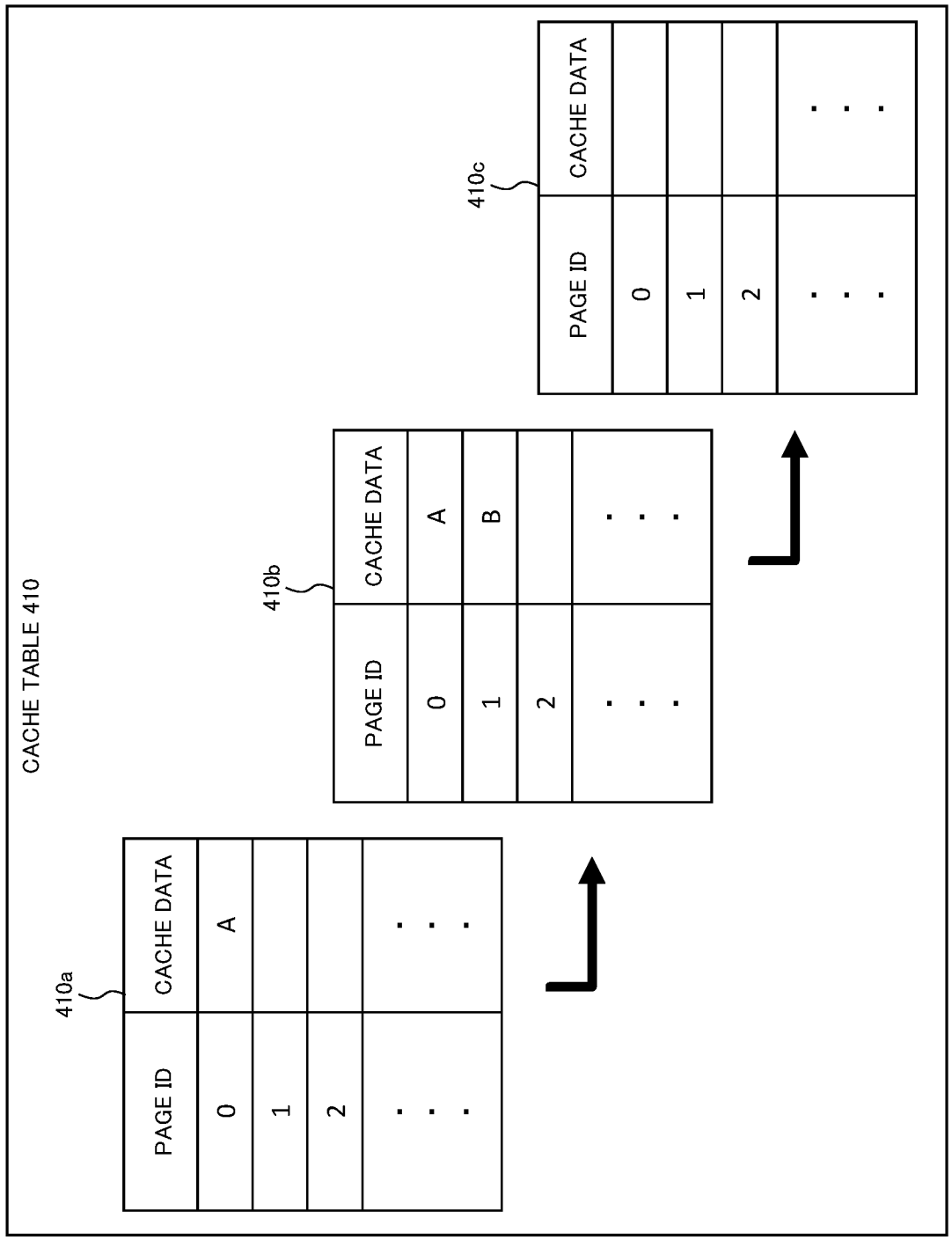
FIG. 3 is a diagram illustrating an example of a part of a cache table.

It is assumed that the data "A" extended by the compression-extension control unit 312 are already stored as cache data having a page ID of "0" in the cache table 410 of the cache storage unit 400 (table 410a in FIG. 3).

It is assumed that not even one adjacent group is set yet in the first situation example. The adjacent group management table 530 and the adjacent group link 540 represent an initial state (namely, a state where not even one adjacent group is set) (table 530a in FIG. 6 and table 540a in FIG. 7). Further, a value of the discard target flag of each page ID in the discard target management table 520 is "0" (initial value) (table 520a in FIG. 5).

Figure 9:
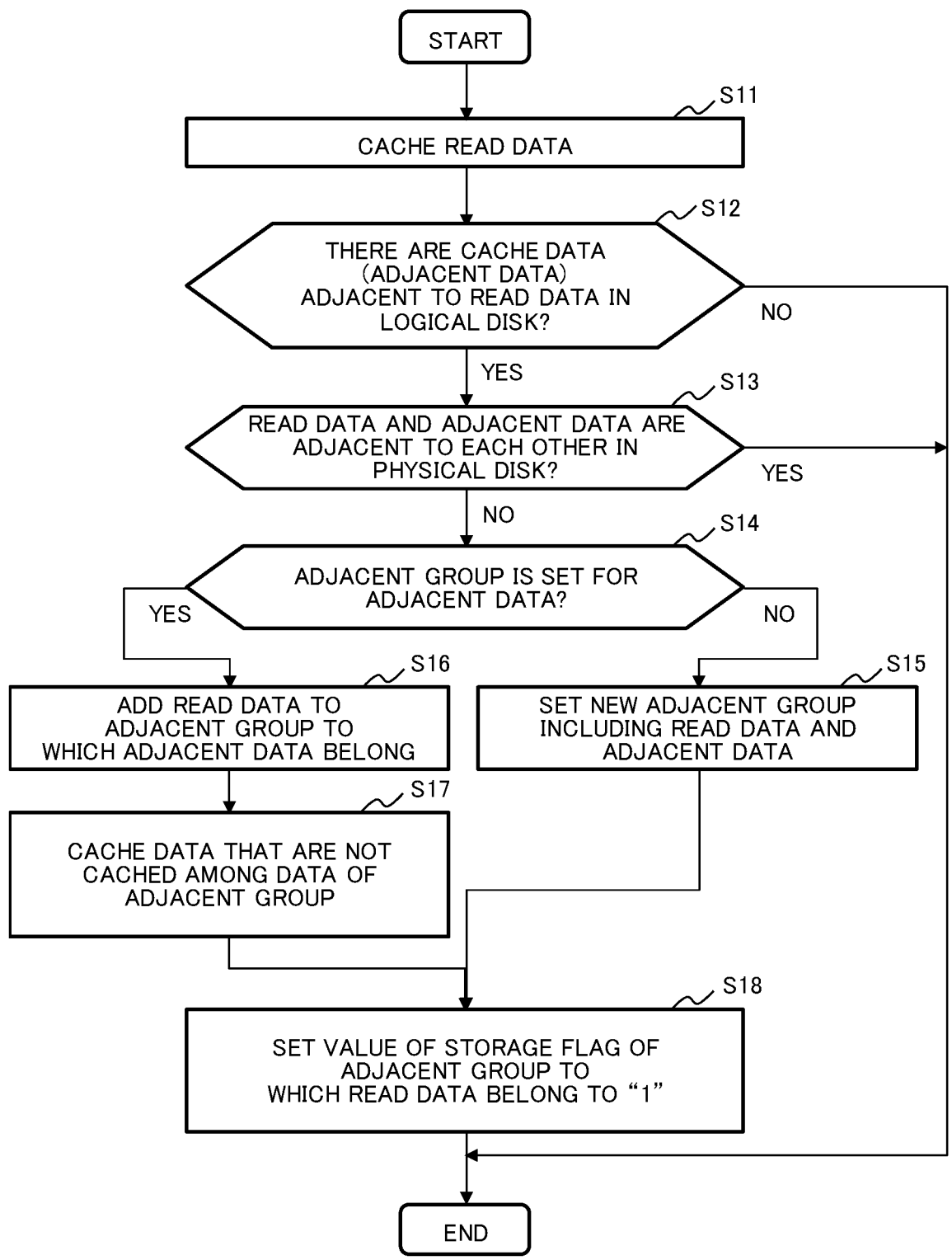
FIG. 9 is a flowchart illustrating a flow of processing in a first case.

It is assumed that the storage array device 300 receives the read request of the data "B" from the host calculator 100 in the first situation example described above. In such a case, the adjacent group is not set for the data "B", and thus the storage controller 310 performs the processing in the first case (step S10). Hereinafter, a flow of the processing in the first case will be described along the first situation example described above. FIG. 9 is a flowchart illustrating the flow of the processing in the first case.

First, the storage controller 310 caches read data (step S11). Specifically, the storage controller 310 reads the read data from the physical disk 800, and extends the read data by the compression-extension control unit 312. Then, the storage controller 310 stores the extended data in the cache storage unit 400. The cache storage unit 400 updates the cache table 410 to a state indicating that the read data "B" is cached as data having the page ID of "1", for example (table 410b in FIG. 3). The storage controller 310 may transmit the data "B" as a response to the read request to the host calculator 100 after the processing in step S11 (step S5 in FIG. 2).

Next, the storage controller 310 checks whether there are cache data adjacent to the read data in the logical disk (step S12). In other words, the storage controller 310 specifies data located immediately before or immediately after a range of a logical address of the read data, and checks whether the specified data are stored in the cache storage unit 400. According to the address translation table 510 (table 510a in FIG. 4), there are the data "A" immediately before the read data "B" and there are the data "C" immediately after the read data "B". Then, according to the cache table 410, the data "A" are stored in the cache storage unit 400, and the data "C" are not stored in the cache storage unit 400. Thus, in such a situation example, the storage controller 310 detects presence of the data "A" as the cache data adjacent to the read data in the logical disk (YES in step S12). In this case, the processing proceeds to step S13. Hereinafter, the data detected in step S12 are referred to as "adjacent data".

Note that, when there are no adjacent data (NO in step S12), the storage controller 310 terminates the processing without performing the processing in and after step S13.

In step S13, the storage controller 310 checks whether the read data and the adjacent data are adjacent to each other in the physical disk 800.

As illustrated in the arrangement example 800a in FIG. 8 and the address translation table 510 (table 510a in FIG. 4), the range of the physical address of the read data "B" and the range of the physical address of the adjacent data "A" are not continuous. In other words, the read data "B" and the adjacent data "A" are not adjacent to each other in the physical disk 800 (NO in step S13). In this case, the processing proceeds to step S14.

Note that, when the read data and the adjacent data are adjacent to each other in the physical disk 800 (NO in step S13), the storage controller 310 may terminate the processing without performing the processing in and after step S14.

In step S14, the storage controller 310 checks whether an adjacent group is set for the adjacent data. In the first situation example, none of the adjacent groups are set for the adjacent data "A" (NO in step S14), the processing proceeds to step S15.

In step S15, the storage controller 310 sets a new adjacent group including the read data and the adjacent data. Specifically, the storage controller 310 selects an unused adjacent group number (for example, a number "0") as an adjacent group number of the new adjacent group to which the read data and the adjacent data belong. Then, the storage controller 310 associates a page ID of the read data and a page ID of the adjacent data with the selected adjacent group number in the adjacent group link 540 (table 540b in FIG. 7). Further, the storage controller 310 may write, to a column of the selected adjacent group number of the adjacent group management table 530, a leading logical address (leading logical address of leading data among data constituting the adjacent group) and a logical range (a length from the leading logical address to a rearmost logical address of rearmost data among the data constituting the adjacent group).

Note that, when the adjacent data belong to the adjacent group (YES in step S14), the processing proceeds to step S16. In step S16, the storage controller 310 adds the read data to the adjacent group to which the adjacent data belong. In other words, the storage controller 310 associates, in the adjacent group link 540, the page ID of the read data with the adjacent group number of the adjacent group to which the adjacent data belong. Further, when there are data that are not cached among the data of the adjacent group to which the adjacent data belong, the data are cached (step S17).

After the processing in step S15 or step S17, the storage controller 310 sets a value of the storage flag of the adjacent group to which the read data belong to "1" in the adjacent group link 540 (step S18).

Then, the storage controller 310 terminates the processing in the first case.

[Supplement]

There may be a case where two pieces of adjacent data are detected in the processing in step S12. In this case, the storage controller 310 may select any one of the two pieces of detected adjacent data as adjacent data handled by the processing in and after step S13.

Alternatively, when an adjacent group is not set for the two pieces of adjacent data, the storage controller 310 may set a new adjacent group including the two pieces of adjacent data and the read data. Further, when an adjacent group is set for one of the two pieces of adjacent data, the storage controller 310 may add the read data and the other piece of adjacent data to the adjacent group. Further, when an adjacent group is set for both of the two pieces of adjacent data, the storage controller 310 may combine the two adjacent groups, and set one adjacent group constituted by data belonging to the original adjacent groups and the read data.

Alternatively, the storage controller 310 may set a different adjacent group for each of the two pieces of adjacent data. Note that, in this case, it is assumed that two adjacent groups including the read data are set.

Alternatively, the storage controller 310 may set a new adjacent group constituted by only the two pieces of adjacent data and the read data. Note that, in this case, each of the two pieces of adjacent data may belong to two adjacent groups (namely, an original adjacent group and a new adjacent group).

[Modification Example 1]

In step S12, the storage controller 310 may be configured in such a way as to detect only adjacent data located either immediately before or immediately after.

[Modification Example 2]

There may be no branch in step S13. In other words, the storage controller 310 may be configured in such a way as to perform the processing in and after step S14 regardless of whether the read data and the adjacent data are adjacent to each other in the physical disk 800. However, when the read data and the adjacent data are adjacent to each other in the physical disk 800, the processing in step S18 may be omitted.

[[Processing in Second Case]]

Figure 10:
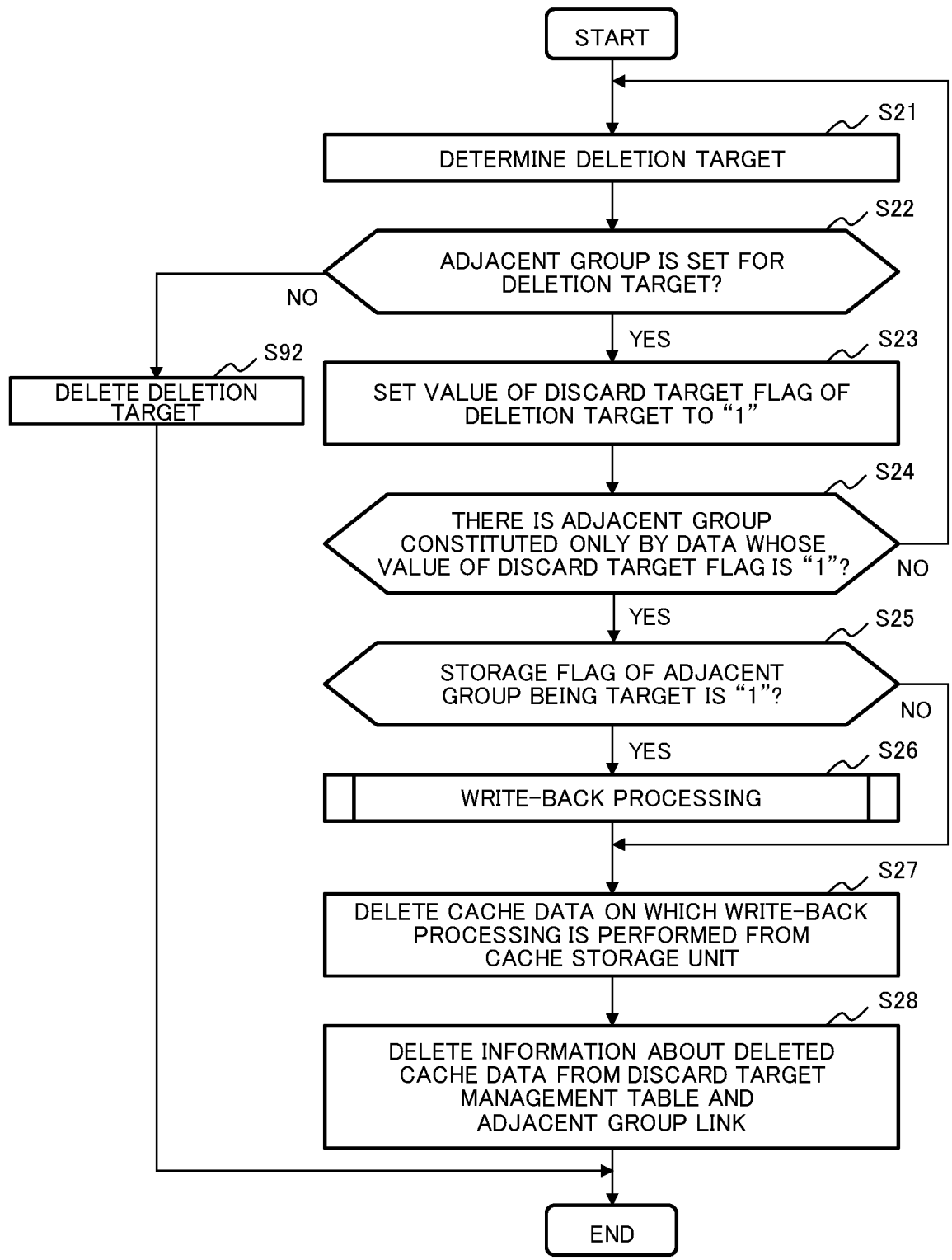
FIG. 10 is a flowchart illustrating a flow of processing in a second case.

A flow of an operation of the storage array device 300 in the second case will be described as the second case where a need for discard of a cache occurs with reference to a flowchart in FIG. 10. As an example (hereinafter also referred to as a "second situation example") of a specific situation, a situation after a series of the processing exemplified in the description of the first case is completed is assumed.

The case where a need for discard of a cache occurs is, for example, a case where there is not enough region for storing new cache data in the cache storage unit 400. In this case, the storage controller 310 first determines a deletion target from among cache data whose value of the discard target flag is "0" (step S21).

The storage controller 310 determines the deletion target according to a least recently used (LRU) method, for example. In other words, the storage controller 310 determines, as the deletion target, cache data having the longest elapsed time since the cache data are being used the last time (including being read and updated, for example).

After determining the deletion target, the storage controller 310 checks whether an adjacent group is set for the deletion target (step S22). For example, it is known that, when the page ID of the deletion target is associated with any of the adjacent group numbers in the adjacent group link 540 (table 540b in FIG. 7), an adjacent group is set for the deletion target.

When no adjacent group is set for the deletion target (NO in step S22), the storage controller 310 may delete the deletion target from the cache storage unit 400 (step S92), and terminate the processing.

When an adjacent group is set for the deletion target (YES in step S22), the storage controller 310 sets a value of the discard target flag of the deletion target to "1" in the discard target management table 520 (step S23). Until a value of all abandonment target flags of cache data associated with the adjacent group is set to "1" in the adjacent group link 540, the storage controller 310 does not perform deletion of the cache data constituting the adjacent group.

When a value of any of the discard target flags of the cache data associated with the adjacent group to which the deletion target having a value of the discard target flag set to "1" belongs is "0", the cache data associated with the adjacent group are not deleted yet. In such a case, the storage controller 310 may perform the processing in step S21 again, and determine a new deletion target (NO in step S24).

Note that, when a new read request with cache data whose value of the discard target flag is "1" as a read target is made by the host calculator 100, the storage controller 310 may set a value of the discard target flag to "0".

Figure 5:
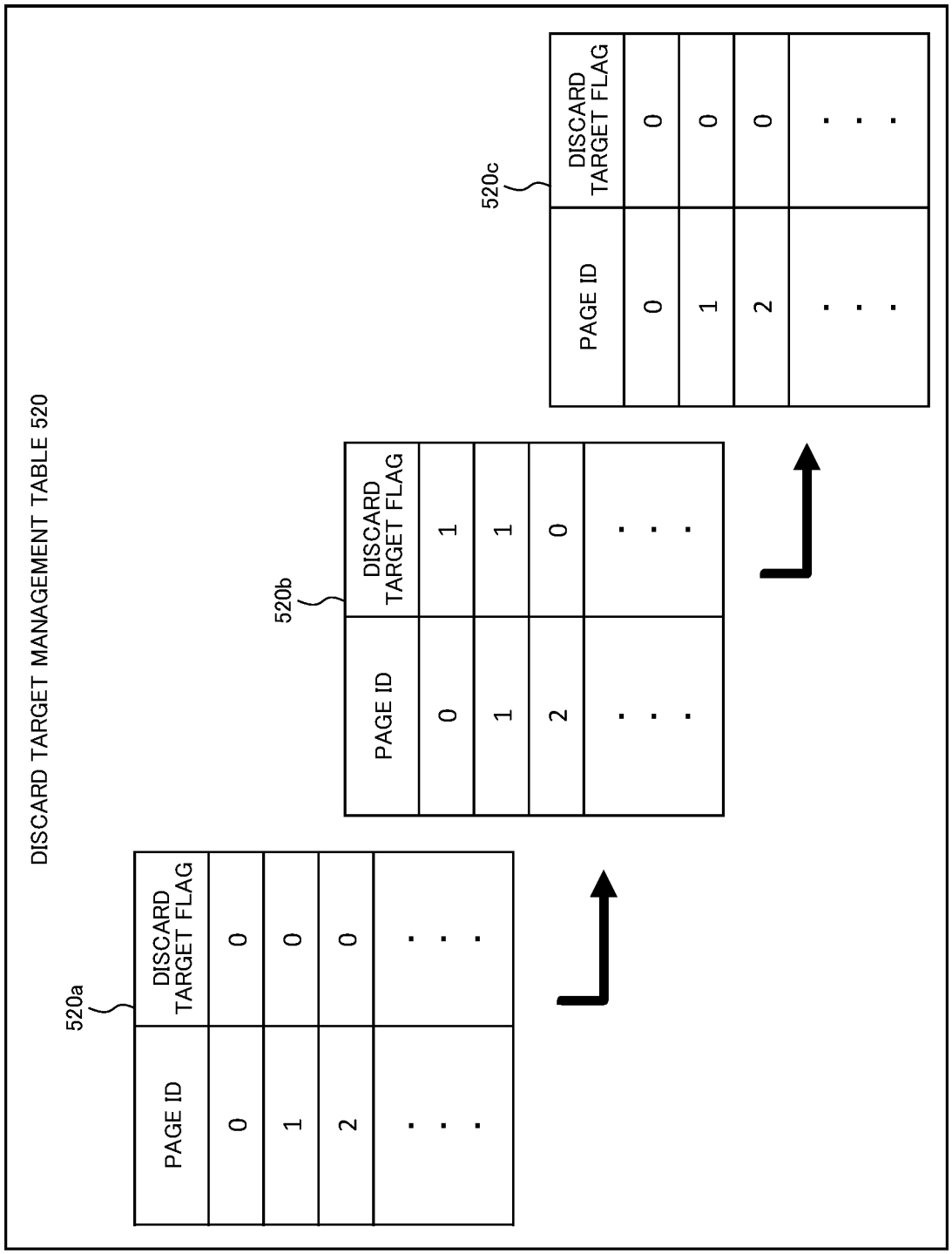
FIG. 5 is a diagram illustrating an example of a discard target management table.

The table 520b in FIG. 5 illustrates an example of the discard target management table 520 when the cache data having the page ID of "0" and the cache data having the page ID of "1" are a deletion target. A value of the discard target flag associated with the two page IDs described above is "1".

When a value of all discard target flags of cache data associated with a certain adjacent group in the discard target management table 520 is "1" as in the table 520b in FIG. 5 (YES in step S24), the storage controller 310 checks whether the storage flag of the adjacent group is "1" in the adjacent group link 540 (step 25).

When the storage flag of the adjacent group is "1" (YES in step S25), the storage controller 310 performs write-back processing targeted for the cache data associated with the adjacent group (step S26). The write-back processing will be described later in detail. When the storage flag of the adjacent group is not "1" (NO in step S25), the storage controller 310 may not perform the processing in step S26.

After the processing in step S26 or when a result of the determination in step S25 is "NO", the storage controller 310 deletes the cache data on which the write-back processing is performed from the cache storage unit 400 (step S27) (table 410c in FIG. 3).

Then, the storage controller 310 deletes information about the deleted cache data from the discard target management table 520 and the adjacent group link 540 (step S28). In other words, the storage controller 310 sets a value of the discard target flag of the page ID of the deleted cache data to the initial value of "0" in the discard target management table 520 (table 520c in FIG. 5). Further, the storage controller 310 sets the adjacent group link 540 to a state where a value of the storage flag of the adjacent group being the target is the initial value of "0" and a state where no data are associated with the adjacent group being the target (table 540a in FIG. 7).

Then, the storage controller 310 terminates the processing in the second case.

[Details of Write-Back Processing]

Figure 11:
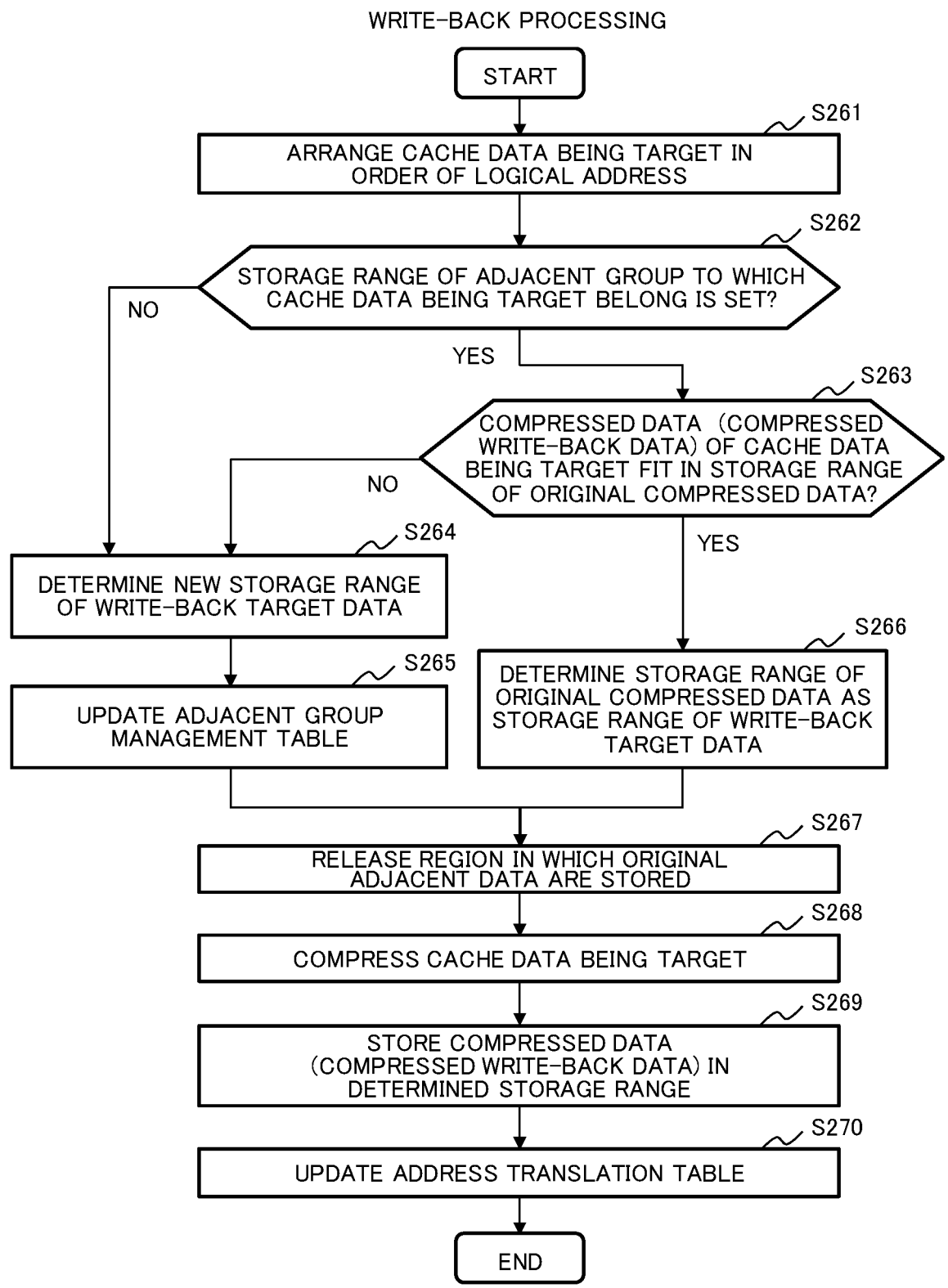
FIG. 11 is a flowchart illustrating details of write-back processing in the processing in the second case.

The write-back processing of storing cache data being a target into the disk drive 320 in step S26 will be described in detail with reference to a flowchart in FIG. 11.

First, the write-back unit 313 in the storage controller 310 arranges cache data being a target of the write-back processing in order of the logical address (step S261). When the data "A" and the data "B" being data associated with the adjacent group number "0" are a target of the write-back processing, the write-back unit 313 arranges the two pieces of data in order of the data "A" and the data "B", based on information about the leading logical address in the address translation table 510 (table 510a in FIG. 4).

Next, the write-back unit 313 checks whether a storage range of the adjacent group to which the cache data being the target belong is set (step S262). In other words, the write-back unit 313 checks whether a leading block address and a block length of the adjacent group (hereinafter also expressed as a "target adjacent group") to which the cache data being the target belong are set in the adjacent group management table 530. In the present example embodiment, the information about the leading block address and the block length is information input for the first time in processing in step S265 described later. Thus, the case where the leading block address and the block length of the target adjacent group are set corresponds to a case where at least a part of cache data belonging to the target adjacent group is subjected to the write-back processing before while the cache data belong to the target adjacent group. The case where the leading block address and the block length of the target adjacent group are not set corresponds to a case where all cache data belonging to the target adjacent group are never subjected to the write-back processing from since the cache data belong to the target adjacent group. In the second situation example, the adjacent group management table 530 is in a state of the table 530a in FIG. 6, and a storage range is not set, and thus a result of the determination in step S262 is "NO".

When the result of the determination in step S262 is "NO", the write-back unit 313 performs processing (described later) in step S264.

Note that, when the result of the determination in step S262 is "YES", the write-back unit 313 determines whether compressed data (hereinafter expressed as "compressed write-back data") of the cache data being a target of the write-back processing fit in a storage range of original compressed data (step S263).

The original compressed data are compressed data corresponding to data before cache data being a target are cached, which are stored in the disk drive 320. The storage range of the original compressed data is indicated by "leading physical address" and "storage block number" in the address translation table 510. For example, with reference to the table 510a in FIG. 4, a storage range of the original compressed data "A" is a range of four blocks (amount of 16 KB) from number "112".

When cache data being a target are not updated from original compressed data, a size of compressed write-back data is the same as a size of the original compressed data. When cache data being a target are updated from original compressed data, the storage controller 310 may compress the cache data being the target by the compression-extension control unit 312, and specify a size of the compressed data. Timing at which the processing of specifying a size of compressed data is performed is no object.

As one example, when compressed write-back data correspond to the whole of cache data constituting a certain adjacent group, the write-back unit 313 may compare a block length of the adjacent group indicated in the adjacent group management table 530 with a size of the compressed write-back data.

When a result of the determination in step S263 is "NO", the write-back unit 313 performs the processing in step S264.

In step S264, the write-back unit 313 determines a new storage range of the compressed write-back data. For example, the write-back unit 313 may arbitrarily specify an empty region in the physical disk in which the compressed write-back data fit, and determine the region as a new storage range. When a region at least either immediately before or immediately after a storage range of the original compressed data of the compressed write-back data is empty, and the storage range can be extended to a length in which the compressed write-back data fit, the write-back unit 313 may determine a range acquired by extending the storage range as a new storage range.

When the new storage range is determined by the processing in step S264, the storage controller 310 updates the adjacent group management table 530 (step S265). Specifically, the storage controller 310 writes, in the adjacent group management table 530, information about the leading physical address and information about the block length of the adjacent group to which the cache data being the target belong, based on the determined new storage range. When all data constituting a target adjacent group are compressed write-back data, the storage controller 310, for example, writes a leading address of the determined storage range as a leading physical address, and writes a length of the determined storage range as a block length. The block length may be a length exceeding a length of the determined storage range as long as the block length has a range that does not overlap a storage range of other data. Note that, when the information about the leading physical address and the information about the block length are already written, the storage controller 310 may update only information that changes due to a change of a storage range of the compressed write-back data from an original storage range.

Further, the storage controller 310 writes or updates a leading logical address (leading logical address of leading data among data constituting a target adjacent group) and a logical range (total of ranges occupied on the logical disk by each piece of the data constituting the target adjacent group).

Note that, when the result of the determination in step S263 is "YES", the write-back unit 313 determines the storage range of the original compressed data as a storage range of the compressed write-back data (step S266). In this case, the write-back unit 313 may not perform the processing in step S264 and step S265.

When the storage range is determined, the write-back unit 313 releases a region in the physical disk 800 in which the original compressed data are stored (step S267). In other words, the write-back unit 313 deletes the original compressed data from the physical disk 800. That is to say, the write-back unit 313 writes invalid data to the region in which the original compressed data are stored.

The compression-extension control unit 312 compresses the cache data being the target (step S268). Then, the write-back unit 313 stores the compressed write-back data being compressed data in the storage range determined in step S264 or step S266 (step S269). As an example, an arrangement of data in the physical disk 800 is as in an arrangement example 800b in FIG. 8.

Further, the storage controller 310 updates the address translation table 510 according to the storage range of the compressed write-back data (step S270). Since the storage range of the data "A" and the data "B" is changed in the second situation example, the storage controller 310 updates a value of "leading physical address" of the data "A" and the data "B" in the address translation table 510 to a number of a new start position of each of the data (table 510b in FIG. 4).

The detailed example of the write-back processing in step S26 is described above.

[[Processing in Third Case]]

The third case is a case where the storage array device 300 receives the write request for a part or the whole of data that do not constitute an adjacent group. For example, a case where the storage array device 300 receives the write request for a part or the whole of the data "B" in an initial state of the first case described above corresponds to the third case.

Figure 12:
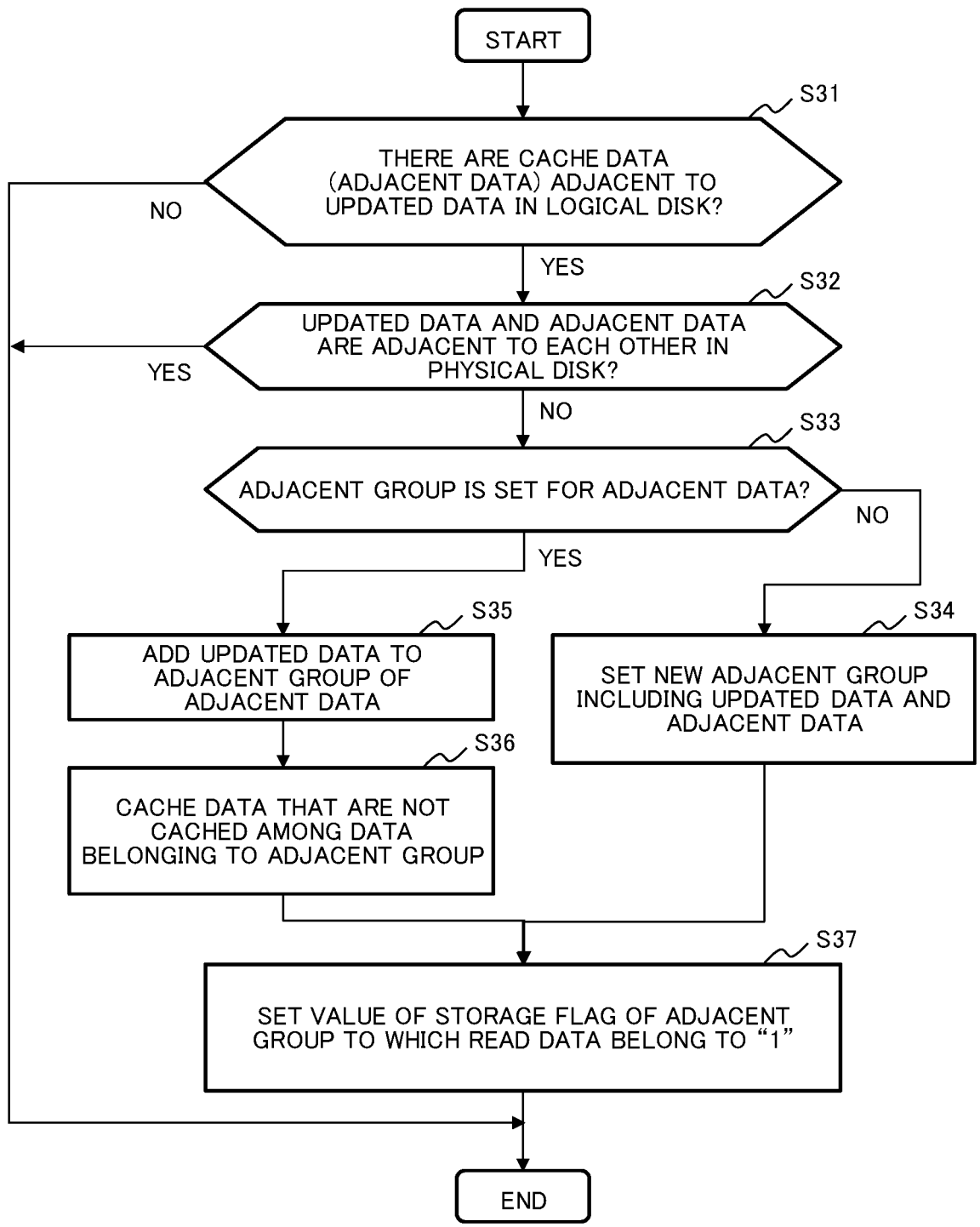
FIG. 12 is a flowchart illustrating a flow of processing in a third case.

A flow of processing in the third case (step S30) will be described with reference to a flowchart in FIG. 12. The flow of the processing in the third case is similar to the processing in the first case.

After the storage controller 310 updates the data being the target according to the write request (step S6 in FIG. 2), the storage controller 310 checks whether there are cache data adjacent to the updated data in the logical disk (step S31). Hereinafter, the data detected in step S31 are referred to as "adjacent data".

When there are no adjacent data (NO in step S31), the storage controller 310 terminates the processing without performing the processing in and after step S32.

When there are the adjacent data (YES in step S31), the storage controller 310 checks whether the updated data and the adjacent data are adjacent to each other in the physical disk 800 (step S32).

When the updated data and the adjacent data are adjacent to each other in the physical disk 800 (YES in step S32), the storage controller 310 terminates the processing without performing the processing in and after step S33.

When the updated data and the adjacent data are not adjacent to each other in the physical disk 800 (NO in step S32), the storage controller 310 then checks whether an adjacent group is set for the adjacent data (step S33).

When the adjacent group is not set for the adjacent data "A" (NO in step S33), the storage controller 310 sets a new adjacent group including the write data and the adjacent data (step S34).

When the adjacent group is set for the adjacent data "A" (YES in step S33), the storage controller 310 adds the write data to the adjacent group to which the adjacent data belong (step S35). In other words, the storage controller 310 associates, in the adjacent group link 540, the page ID of the write data with the adjacent group number of the adjacent group to which the adjacent data belong. Further, the storage controller 310 caches data that are not cached among data belonging to the adjacent group to which the adjacent data belong (step S36).

After the processing in step S35 or step S36, the storage controller 310 sets a value of the storage flag of the adjacent group to which the write data belong to "1" in the adjacent group link 540 (step S37).

Then, the storage controller 310 completes the processing in the third case.

[[Processing in Fourth Case]]

The fourth case is a case where the storage array device 300 receives the read request for a part or the whole of data constituting an adjacent group.

As an example (hereinafter also referred to as a "fourth situation example") of a situation immediately before the fourth case occurs, a situation after a series of the processing exemplified in the second case described above is assumed. In other words, it is assumed that the data "A" and the data "B" belong to the adjacent group having the adjacent group number of "0", and are arranged next to each other and stored on the physical disk 800.

Figure 4:
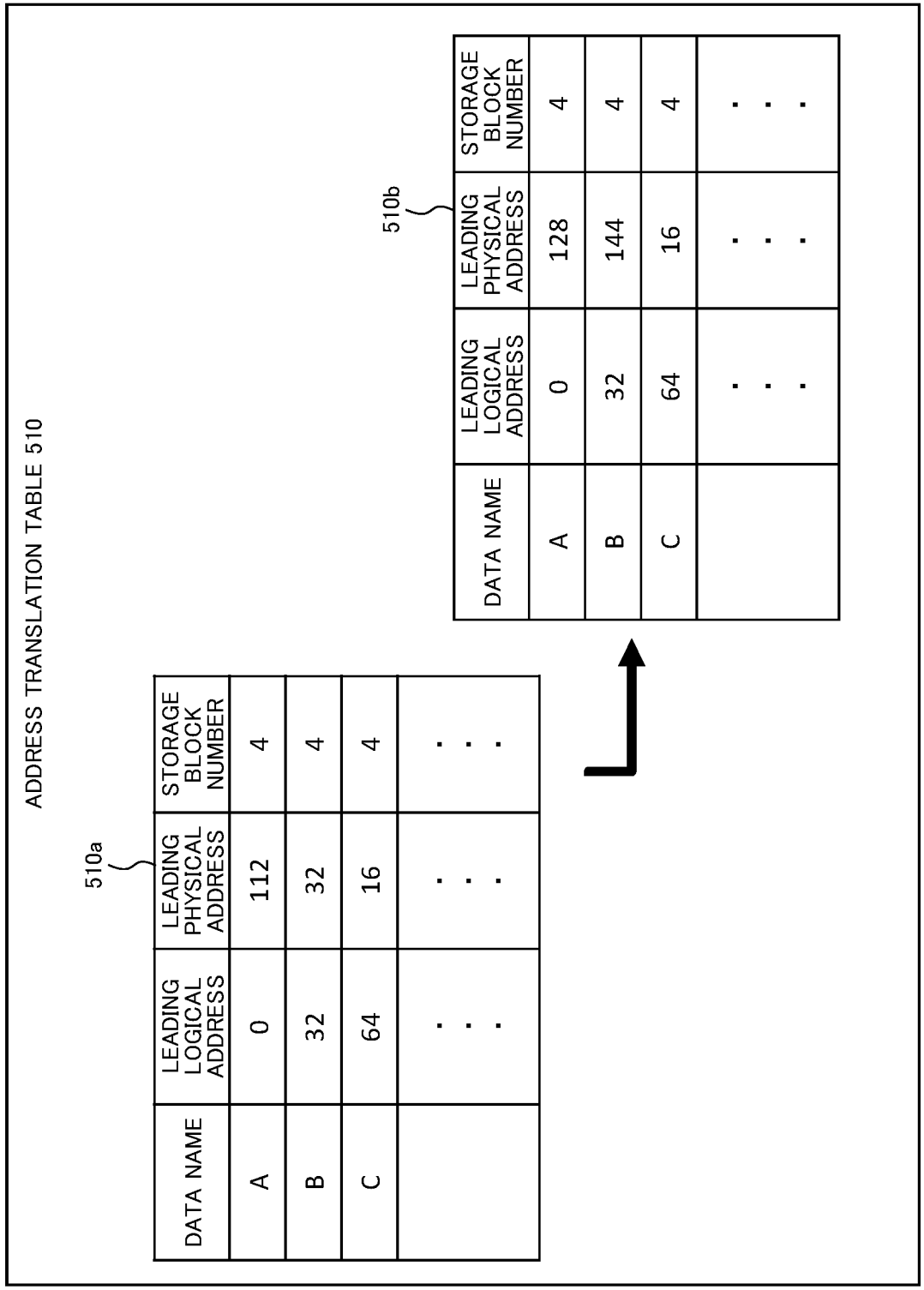
FIG. 4 is a diagram illustrating an example of an address translation table.
Figure 7:
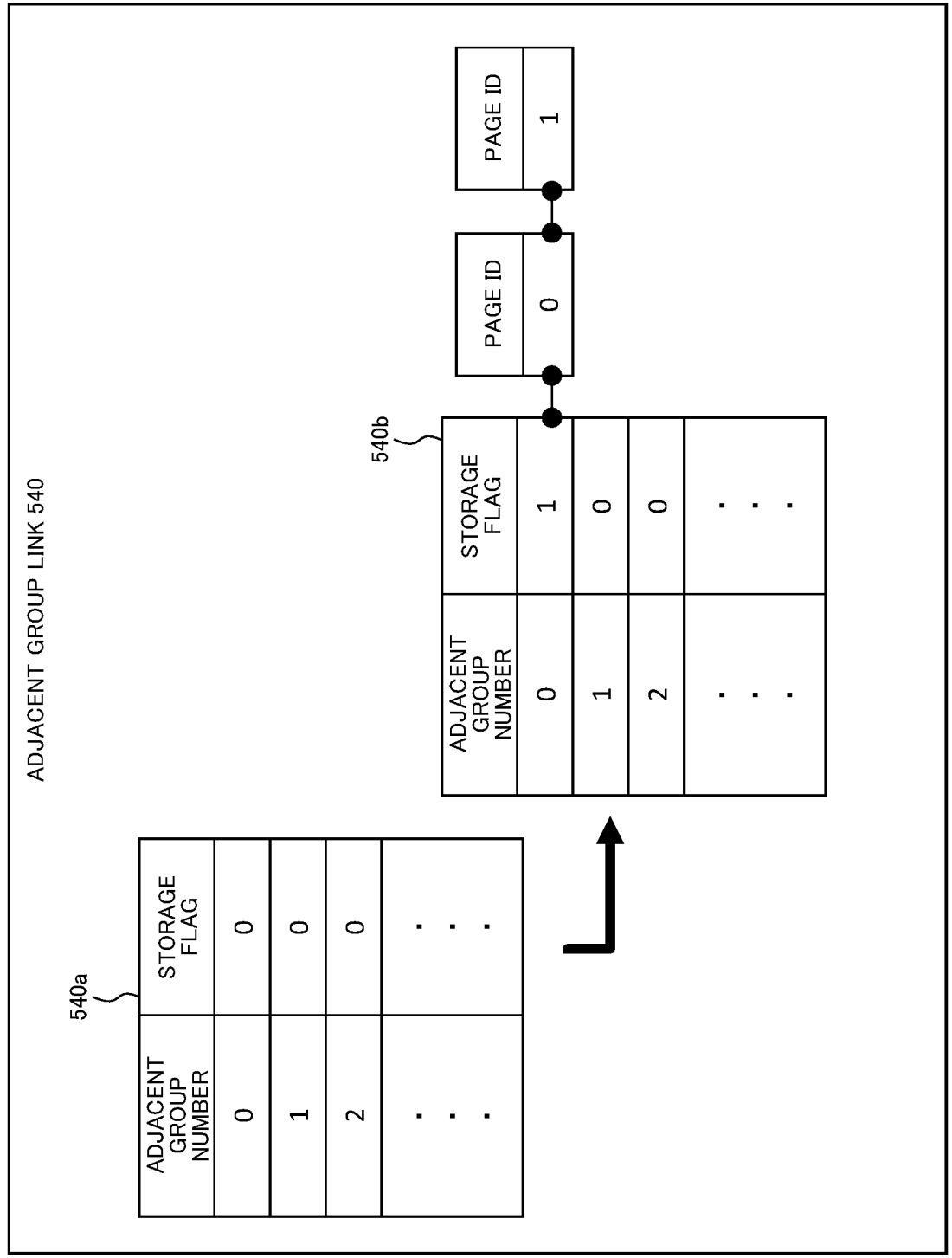
FIG. 7 is a diagram illustrating an example of an adjacent group link.

It is assumed that the cache table 410 is in a state of the table 410c in FIG. 3, the address translation table 510 is in a state of the table 510b in FIG. 4, the discard target management table 520 is in a state of the table 520c in FIG. 5, the adjacent group management table 530 is in a state of the table 530b in FIG. 6, the adjacent group link 540 is in a state of the table 540a in FIG. 7, and an arrangement of data in the physical disk 800 is in a state of the arrangement example 800b in FIG. 8.

Figure 13:
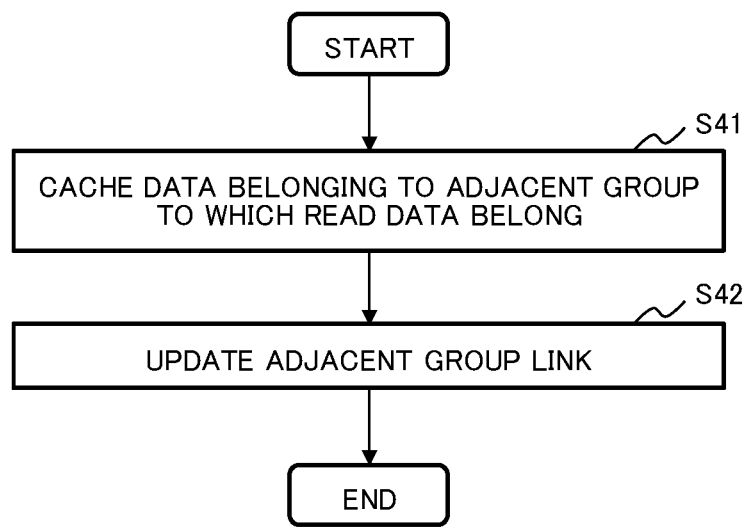
FIG. 13 is a flowchart illustrating a flow of processing in a fourth case.

In the fourth situation example as described above, it is assumed that the read request including a request for reading the data "B" is transmitted from the host calculator 100. As illustrated in the table 510*b* in FIG. 4 and the table 530*b* in FIG. 6, the data "B" are included in the storage range of the adjacent group having the adjacent group number of "0", and thus the storage controller 310 performs the processing in the fourth case (step S40). Hereinafter, a flow of the processing in the fourth case will be described with reference to a flowchart in FIG. 13.

First, the storage controller 310 caches data belonging to an adjacent group to which read data belong (step S41). The storage controller 310 may read a range indicated by information about "leading address" and information about "block length" in the adjacent group management table 530 from the physical disk 800. In this way, in the fourth situation example, the data "A" being data belonging to the same adjacent group as the read data "B" are stored in the cache storage unit 400.

The storage controller 310 may transmit the data "B" as a response to the read request to the host calculator 100 after the processing in step S41 (step S5 in FIG. 2).

Then, the storage controller 310 updates the adjacent group link 540 (step S42). Specifically, the storage controller 310 associates, in the adjacent group link 540, the data (read data) constituting the adjacent group with an adjacent group number of the adjacent group to which the read data belong.

Note that a value of the storage flag may remain as "0".

Further, the storage controller 310 may set a value of the discard target flag to "1" for data other than the read data that are cached by the processing in step S42.

Then, the processing of the storage array device 300 in the fourth case is completed.

[Supplement 1] When Read Data Belong to a Plurality of Groups

In the example embodiment in which a certain piece of data may belong to a plurality of groups, there may be a case where a plurality of adjacent groups to which the read data belong are detected in step S41. In such a case, for example, the storage controller 310 may select any one of the detected adjacent groups as an adjacent group being a target of the processing in the fourth case.

In selecting an adjacent group, the selection may be made based on any algorithm that determines an order of priority. The algorithm described above may be an algorithm that evaluates a group having a higher average of use frequency of constituting data to be in a higher order of priority, an algorithm that evaluates a shorter elapsed period of time since data used the last time among constituting data are used the last time to be in a higher order of priority, an algorithm that evaluates a shorter data length (or a longer data length) to be in a higher order of priority, or a combination of the algorithms.

[Supplement 2] Length of Data to be Read

When data adjacent to each other are limitlessly formed into groups, there may be a case where data being a target of caching in the processing in step S42 are too long.

Thus, the storage controller 310 may narrow a range to be read in the processing in step S42. For example, the storage controller 310 may read, among compressed data constituting the adjacent group, a set of continuous compressed data within a range having a predetermined length.

For example, the storage controller 310 may read data in a range of a predetermined length including the read data and data before the read data. Alternatively, the storage controller 310 may read a storage range of the read data and data in a range at a predetermined length before the read data.

[[Processing in Fifth Case]]

Figure 14:
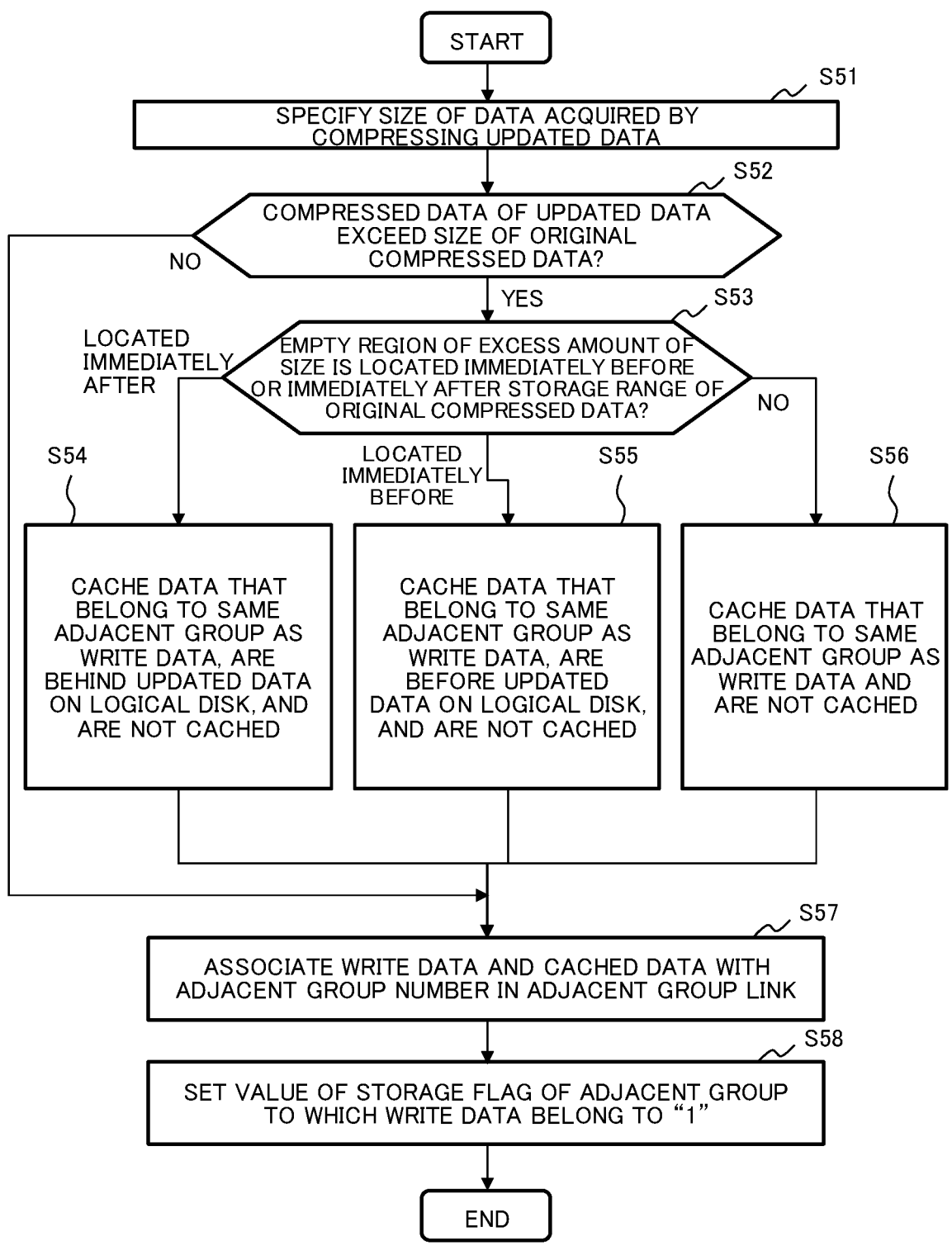
FIG. 14 is a flowchart illustrating a flow of processing in a fifth case.

The fifth case is a case where the storage array device 300 receives the write request for a part or the whole of data constituting an adjacent group. A flow of processing in the fifth case (step S50) will be described with reference to a flowchart in FIG. 14.

After the storage controller 310 updates data (hereinafter referred to as "write data") being a target of the write request according to the write request (step S6 in FIG. 2), the storage controller 310 specifies a size of data acquired by compressing the updated data of the write data (step S51). The storage controller 310 may compress the updated data by the compression-extension control unit 312, and specify a size of the compressed data. The storage controller 310 may temporarily store the compressed data in the cache storage unit 400.

Next, the storage controller 310 checks whether the compressed data of the updated data exceed a size of original compressed data (step S52).

When the compressed data of the updated data do not exceed the size of the original compressed data, the updated data should fit in a storage range of the original compressed data. In such a case (NO in step S52), a content of the adjacent group management table 530 may not be changed. Further, the storage controller 310 does not need to rearrange the data constituting the adjacent group to which the write data belong. Therefore, the processing proceeds to step S57 described later.

When the compressed data of the updated data exceed the size of the original compressed data (YES in step S52), a storage range of at least a part of data of the adjacent group to which the write data belong needs to be changed. In this case, the storage controller 310 checks whether an empty region of an amount (hereinafter "excess amount") by which the compressed data of the updated data exceed the size of the original compressed data is located immediately before or immediately after the storage range of the original compressed data (step S53).

When the empty region of the excess amount is located immediately after the region of the original compressed data ("located immediately after" in step S53), the storage controller 310 may extend the storage range of the compressed data to the rear. In this case, data before (ahead of, earlier than) the write data on the physical disk do not need to be moved. The storage controller 310 caches data that are not cached, and located behind the updated data on the logical disk among the data belonging to the same adjacent group as the write data (step S54).

When the empty region of the excess amount is located immediately before the region of the original compressed data ("located immediately before" in step S53), the storage controller 310 may extend the storage range of the compressed data to the front side. In this case, data behind the write data on the physical disk do not need to be moved. The storage controller 310 caches data that are not cached, and located before (ahead of, earlier than) the updated data on the logical disk among the data belonging to the same adjacent group as the write data (step S55).

When the empty region of the excess amount is not located immediately before and immediately after the region of the original compressed data ("NO" in step S53), the whole of the data belonging to the adjacent group to which the write data belong needs to be moved. The storage controller 310 caches data that belong to the same adjacent group as the write data and are not cached (step S56).

After the processing in step S54, step S55, or step S56, the processing proceeds to step S57.

In step S57, the storage controller 310 associates, in the adjacent group link 540, the write data and the data (when there are the data) cached in the processing in step S54 to step S56 with the adjacent group number of the adjacent group to which the write data belong.

Then, the storage controller 310 sets a value of the storage flag of the adjacent group to which the write data belong to "1" in the adjacent group link 540 (step S58).

Then, the processing of the storage array device 300 in the fifth case is completed.

[Specific Example]

As an example of a situation in which the fifth case occurs, a situation after a series of the processing exemplified in the second case described above is assumed. In other words, it is assumed that the data "A" and the data "B" belong to the adjacent group having the adjacent group number of "0", and are arranged next to each other and stored on the physical disk 800.

Figure 15:
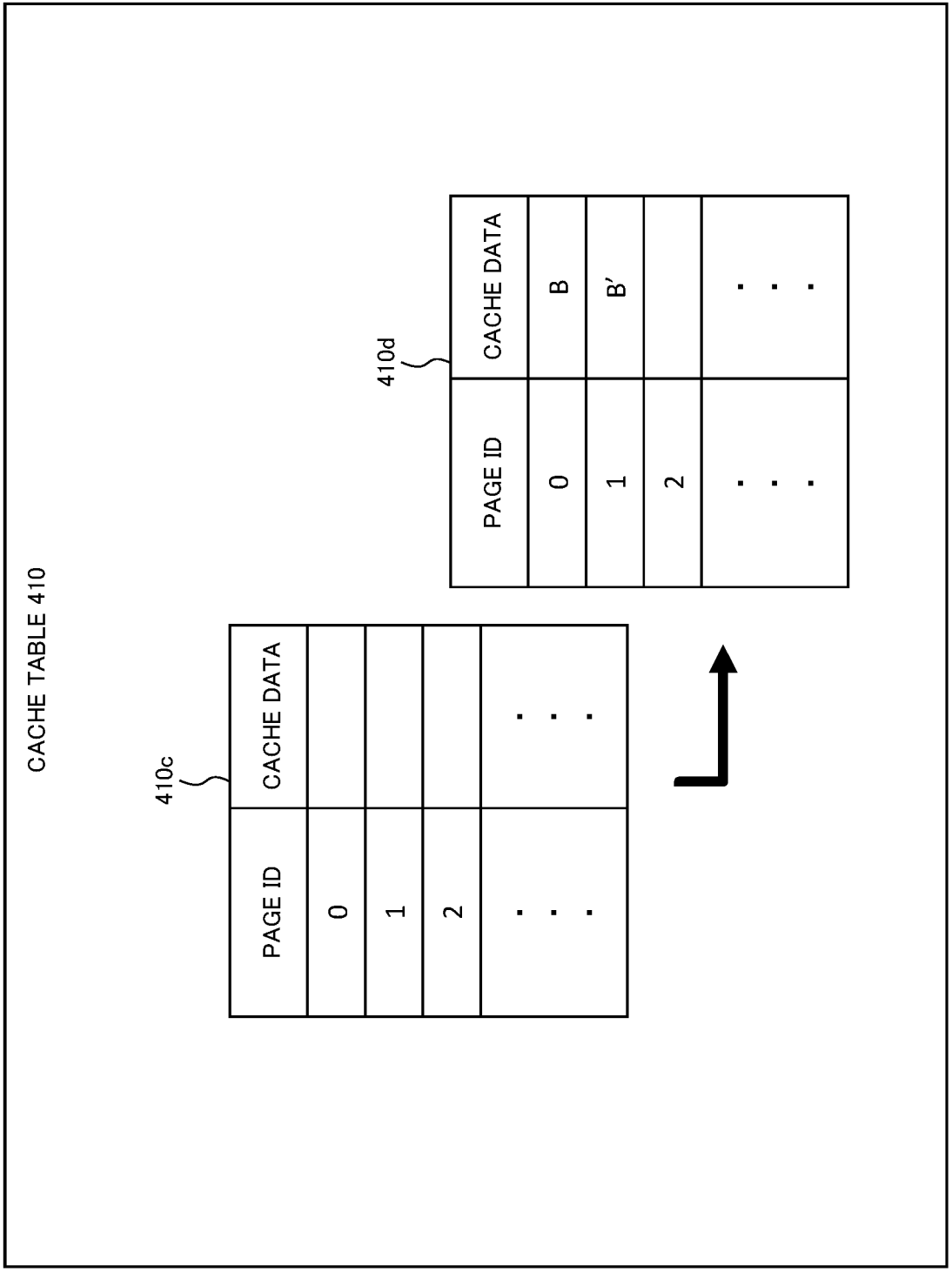
FIG. 15 is a diagram illustrating another example of a part of the cache table.
Figure 16:
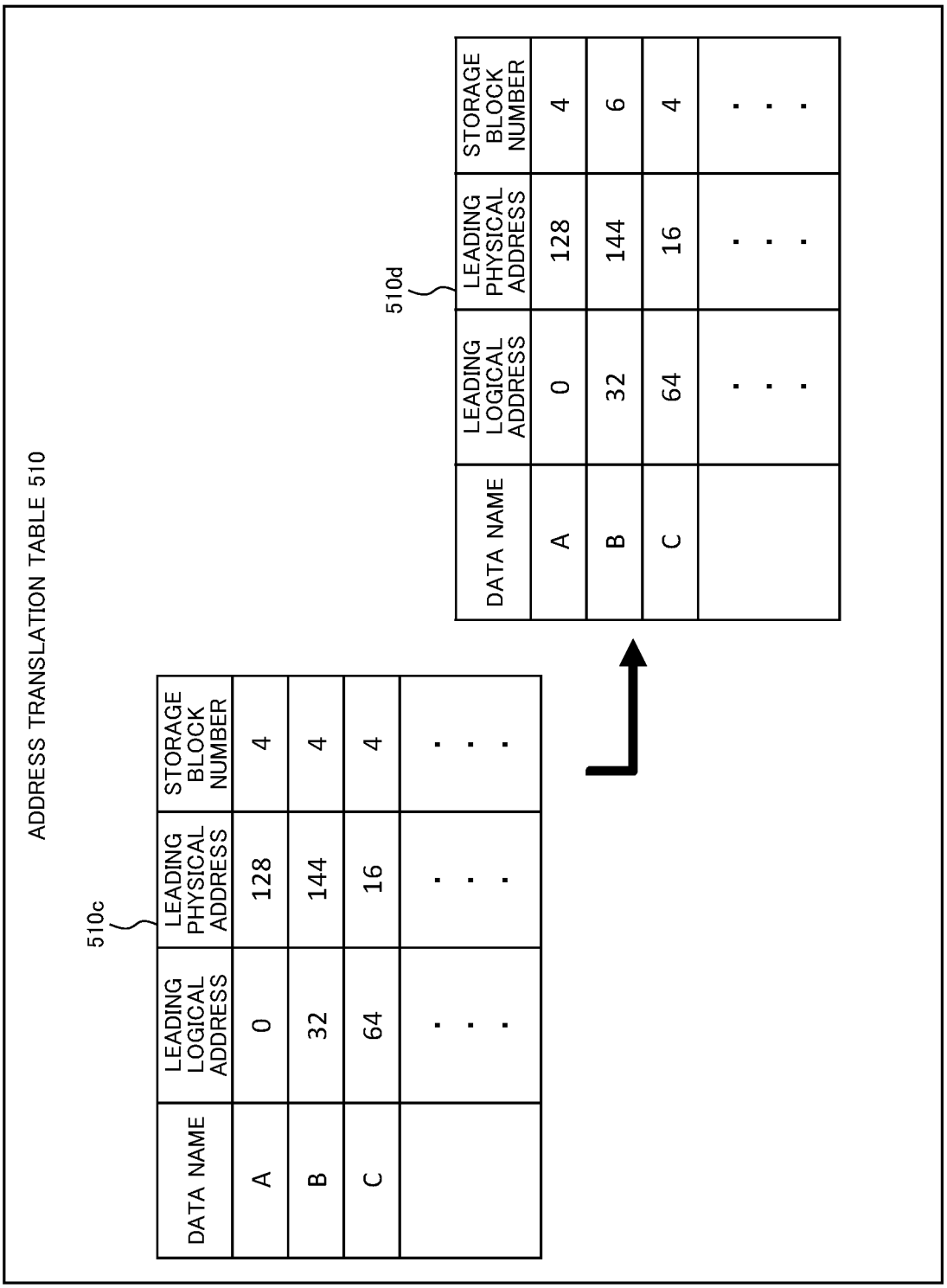
FIG. 16 is a diagram illustrating another example of the address translation table.
Figure 18:
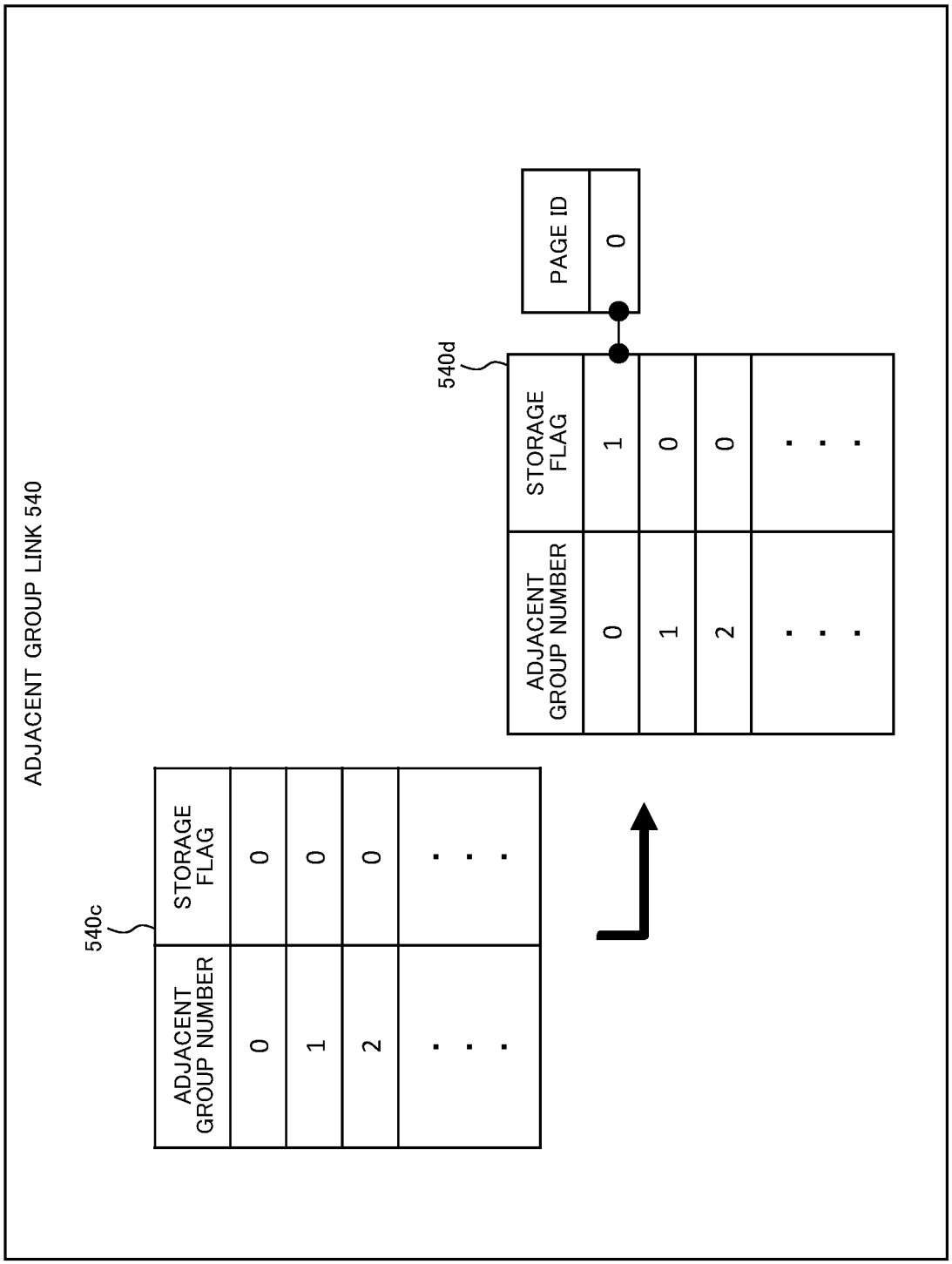
FIG. 18 is a diagram illustrating another example of the adjacent group link.
Figure 19:
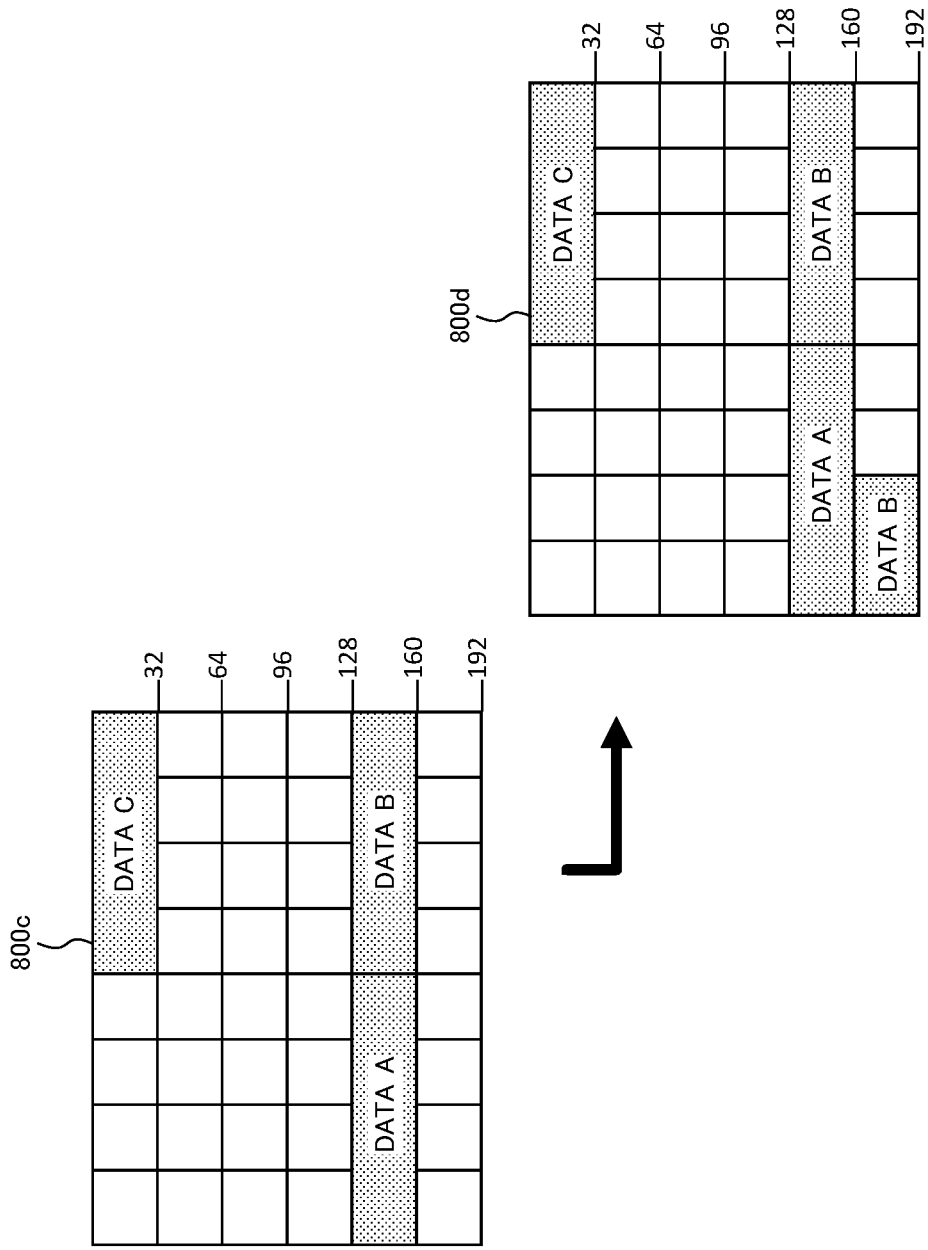
FIG. 19 is a diagram illustrating another example of the arrangement of the data in the physical disk.

It is assumed that the cache table 410 is in a state of the table 410c in FIG. 15, the address translation table 510 is in a state of the table 510c in FIG. 16, the adjacent group management table 530 is in a state of the table 530c in FIG. 17, the adjacent group link 540 is in a state of the table 540c in FIG. 18, and an arrangement of data in the physical disk 800 is in a state of the arrangement example 800c in FIG. 19.

It is assumed that the write request including a request for updating the data "B" is transmitted from the host calculator 100 in the situation as described above. A flow of processing of the storage array device 300 in this case will be described.

When the storage array device 300 receives the write request (step S1), the storage controller 310 caches the data "B", and updates the cached data "B" (step S6). According to the adjacent group management table 530, the adjacent group having the adjacent group number of "0" is set for the data "B" (YES in step S7), and thus the storage controller 310 specifies a size of data when the updated data "B" are compressed (step S51). As an example, the storage controller 310 compresses the updated data by the compression-extension control unit 312, and stores compressed data "B'" as data having the page ID of "1" in the cache table 410 (table 410d in FIG. 15). Then, the storage controller 310 specifies a size of the compressed data "B'". It is assumed that the size of the compressed data "B'" is 24 KB.

The compressed data of the updated data exceeds the size of the original compressed data (YES in step S52), and thus the storage controller 310 checks whether an empty region of an excess amount, namely, a difference (8 KB) between the data "B'" and the original compressed data "B" is located immediately before or immediately after the storage range of the original compressed data (step S53).

It is assumed that the empty region of 8 KB is located immediately after the region of the original compressed data ("located immediately after" in step S53). In this case, the processing proceeds to step S54, but the data "B" are rearmost data in the adjacent group, and thus there are no data that need to be cached.

Then, the storage controller 310 associates the page ID of the data "B" with the adjacent group number "0" (step S57). Further, the storage controller 310 sets a value of the storage flag of the adjacent group having the adjacent group number of "0" to "1" (step S58). The adjacent group link 540 is brought into a state of the table 540d in FIG. 18.

Subsequently, when the discard target flag of the data "B" is "1" without the data "A" being cached, the data "B" are compressed and stored into the physical disk 800 by the write-back processing in step S26. The storage controller 310 determines, for example, a range from the physical address number "144" to "167" as a new storage range of the data "B" by the processing in step S264. The adjacent group management table 530 is updated to, for example, a state of the table 530d in FIG. 17 by the processing in step S265. The compressed data "B'" are stored into the physical disk 800 as illustrated in the arrangement example 800d in FIG. 19 by the processing in step S269. Further, the address translation table 510 is brought into a state of the table 510d in FIG. 16 by the processing in step S270.

[Another Specific Example]

A flow of processing when a result of the determination in step S53 is "NO" in the specific example described above will be described. In this case, the processing proceeds to step S56, and the storage controller 310 caches the data "A".

Then, the storage controller 310 associates the page ID of the data "B" and the page ID of the data "A" with the adjacent group number "0" (step S57). Further, the storage controller 310 sets a value of the storage flag of the adjacent group having the adjacent group number of "0" to "1" (step S58).

Subsequently, when the discard target flag of both of the data "A" and the data "B" is "1", the data "A" and the data "B" are compressed and stored into the physical disk 800 by the write-back processing in step S26. By the processing in step S264, for example, a range from the physical address number "1056" to "1071" is determined as a new storage range of the data "A", and a range from "1072" to "1095" is determined as a new storage range of the data "B".

<Advantageous Effect>

According to the storage array device 300 in the first example embodiment, by the write-back processing, data having logical addresses adjacent to each other among cached data are also adjacent to each other in the physical address. In this way, performance related to reading of data improves. The reason is that a plurality of pieces of data having logical addresses adjacent to each other (that is, highly likely to be a target of a read request simultaneously) can be read at once (that is, continuously by one seek).

The write-back processing is performed at timing at which all of data being a target are an discard target, based on the LRU method, and thus the write-back processing does not compete with a request from the host calculator 100 being a host device. In other words, sorting of data is performed without causing a decrease in performance of a response to the request.

Note that, as described in the first case, the storage controller 310 also performs the write-back processing on data for which only a read request is made, and thus more data are conceivably adjacent to each other in both of the logical address and the physical address.

According to the processing in the fourth case, the data adjacent to the read data are cached before a request for an operation on the data adjacent to the read data is transmitted. In this way, data adjacent to each other on the logical address are more likely to be highly related, and thus a cache hit rate improves.

Particularly, when there is a frequently used data group, such as a thin client, an improvement of performance of a response to the host calculator 100 is significant. By setting an adjacent group for the frequently used data group, data constituting the data group are continuously arranged in the physical disk, and time for reading a plurality of pieces of data constituting the data group at once is shortened. Then, when the data constituting the data group are previously read by the processing in the fourth case before the read request is received, a response to the request is even faster.

<<Second Example Embodiment>>

Figure 20:
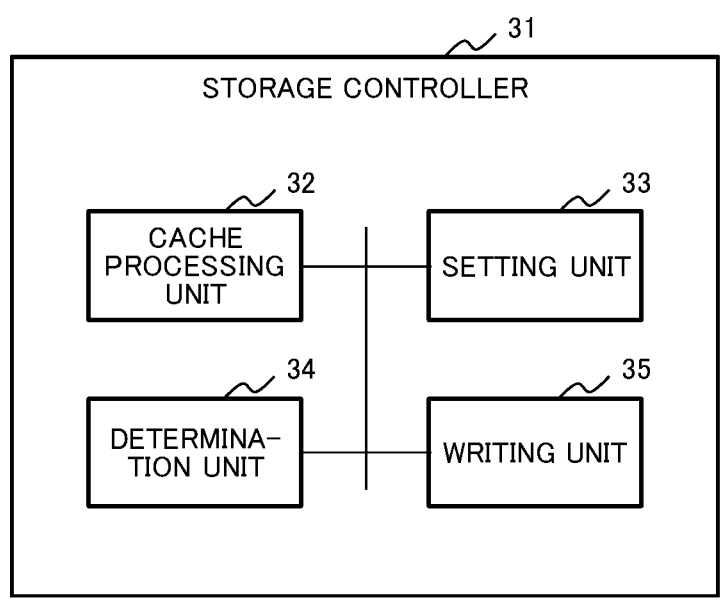
FIG. 20 is a block diagram illustrating a functional configuration of a storage array device according to one example embodiment of the present invention.

A storage controller 31 according to an example embodiment of the present invention will be described. The storage controller 31 is a module that performs reading of data from a storage in which a logical disk is constructed and writing of data to the storage. FIG. 20 is a block diagram illustrating a configuration of the storage controller 31. The storage controller 31 includes a cache processing unit 32, a setting unit 33, a determination unit 34, and a writing unit 35.

The cache processing unit 32 performs cache processing of storing, in a cache storage unit, data stored in a physical disk. The physical disk is an entity that stores data in the storage. The cache storage unit is a storage region that stores data as a cache. The compression-extension control unit 312 in the first example embodiment is one example of the cache processing unit 32.

The setting unit 33 specifies a set of data that are adjacent to each other in the logical disk and are not adjacent to each other in the physical disk among the data stored in the cache storage unit. Then, the setting unit 33 sets a group including the specified set of data.

Two pieces of data being adjacent to each other in the logical disk mean that ranges of logical addresses set for each of the two pieces of data are continuous.

Two pieces of data being adjacent to each other in the physical disk mean that ranges of blocks set as places in which each of the two pieces of data are stored are continuous.

The processing in the first case in the first example embodiment is one example of the processing described above by the setting unit 33.

The determination unit 34 performs determination processing at an opportunity in which all cached data among data belonging to the group are a target to be deleted from the cache storage unit. In the determination processing, the determination unit 34 determines a range in the physical disk in which the data being the target to be deleted are stored in such a way that all the data belonging to the group are continuously arranged in the physical disk. The processing from step S261 to step S266 of "write-back processing" in the first example embodiment is one example of the determination processing described above.

The writing unit 35 writes the data being the target to be deleted to the range determined by the determination unit 34. The processing in step S268 and step S269 of "write-back processing" in the first example embodiment is one example of the processing by the writing unit 35.

Figure 21:
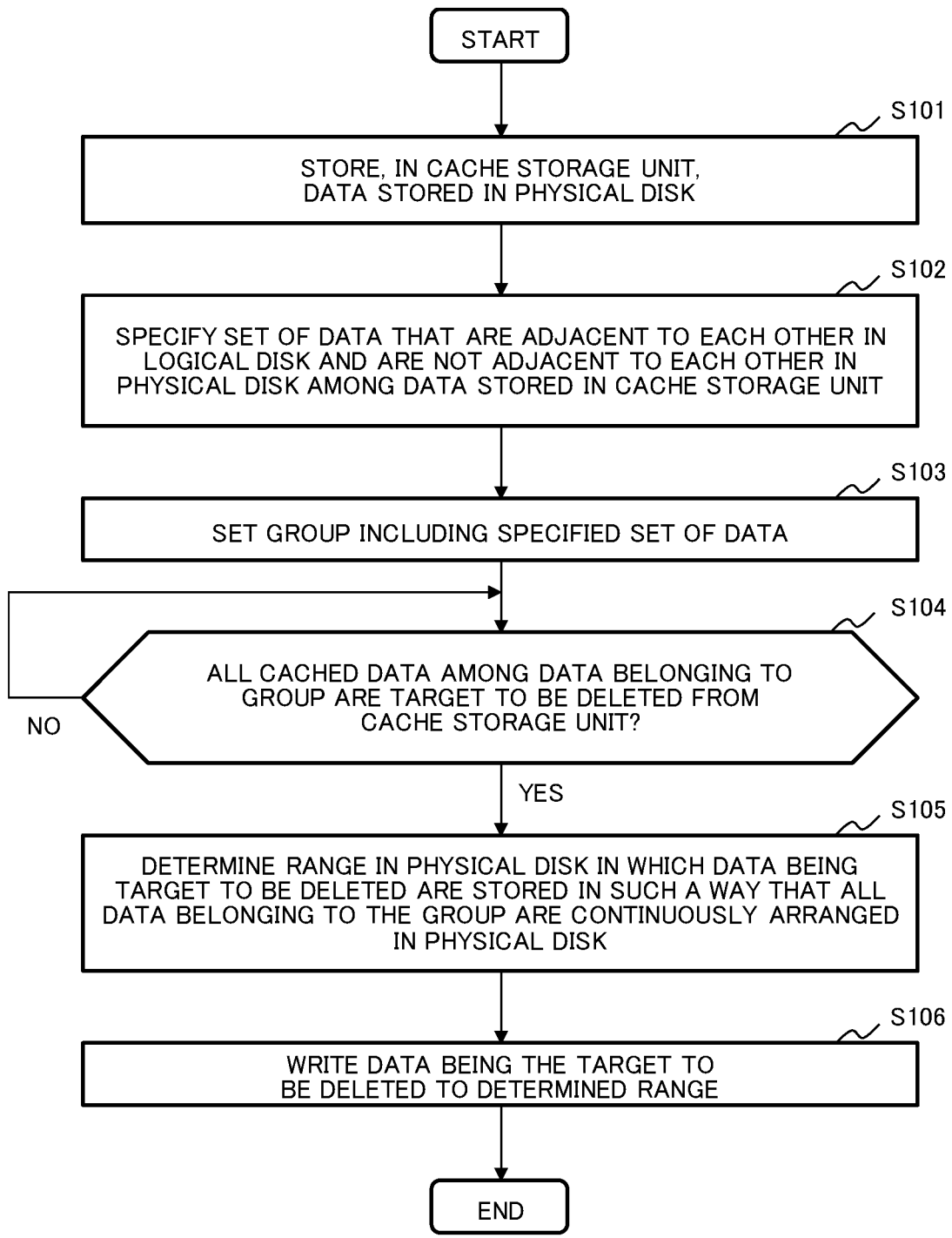
FIG. 21 is a flowchart illustrating a flow of an operation of the storage array device according to one example embodiment of the present invention.

A flow of processing by the storage controller 31 will be described with reference to a flowchart in FIG. 21.

First, the cache processing unit 32 performs the cache processing of storing, in the cache storage unit, data stored in the physical disk (step S101). An opportunity at which the cache processing is performed is receiving a read request or a write request from a host device such as a host calculator, for example.

Next, the setting unit 33 specifies a set of data that are adjacent to each other in the logical disk and are not adjacent to each other in the physical disk among the data stored in the cache storage unit (step S102). Then, the setting unit 33 sets a group including the specified set of data (step S103).

Next, at the opportunity in which all cached data among the data belonging to the group are a target to be deleted from the cache storage unit (YES in step S104), the determination unit 34 determines a range in the physical disk in which the data being the target to be deleted are stored in such a way that all the data belonging to the group are continuously arranged in the physical disk.

Then, the writing unit 35 writes the data being the target to be deleted to the range determined by the determination unit 34 (step S105).

<Configuration of Hardware That Achieves Each Unit of Example Embodiment>

A block indicating each component of each device is represented in a functional unit in each of the example embodiments according to the present invention described above. However, the block indicating a component may not necessarily mean that each component is constituted of a separate module.

Processing of each component may be achieved by, for example, a computer system for reading and executing a program that causes the computer system to perform the processing. The program is stored in a computer-readable storage medium. The "computer-readable storage medium" is, for example, a portable medium such as an optical disk, a magnetic disk, a magneto-optical disk, and a non-volatile semiconductor memory, and a storage device such as a read only memory (ROM) built in the computer system and a hard disk. The "computer-readable storage medium" also includes a medium that can temporarily hold a program, such as a volatile memory inside the computer system, and a medium that transmits a program, such as a communication line such as a network and a telephone line. Further, the above-described program may be a program for achieving a part of the above-mentioned function, and may further be a program capable of achieving the above-mentioned function by a combination with a program already stored in the computer system.

Figure 22:
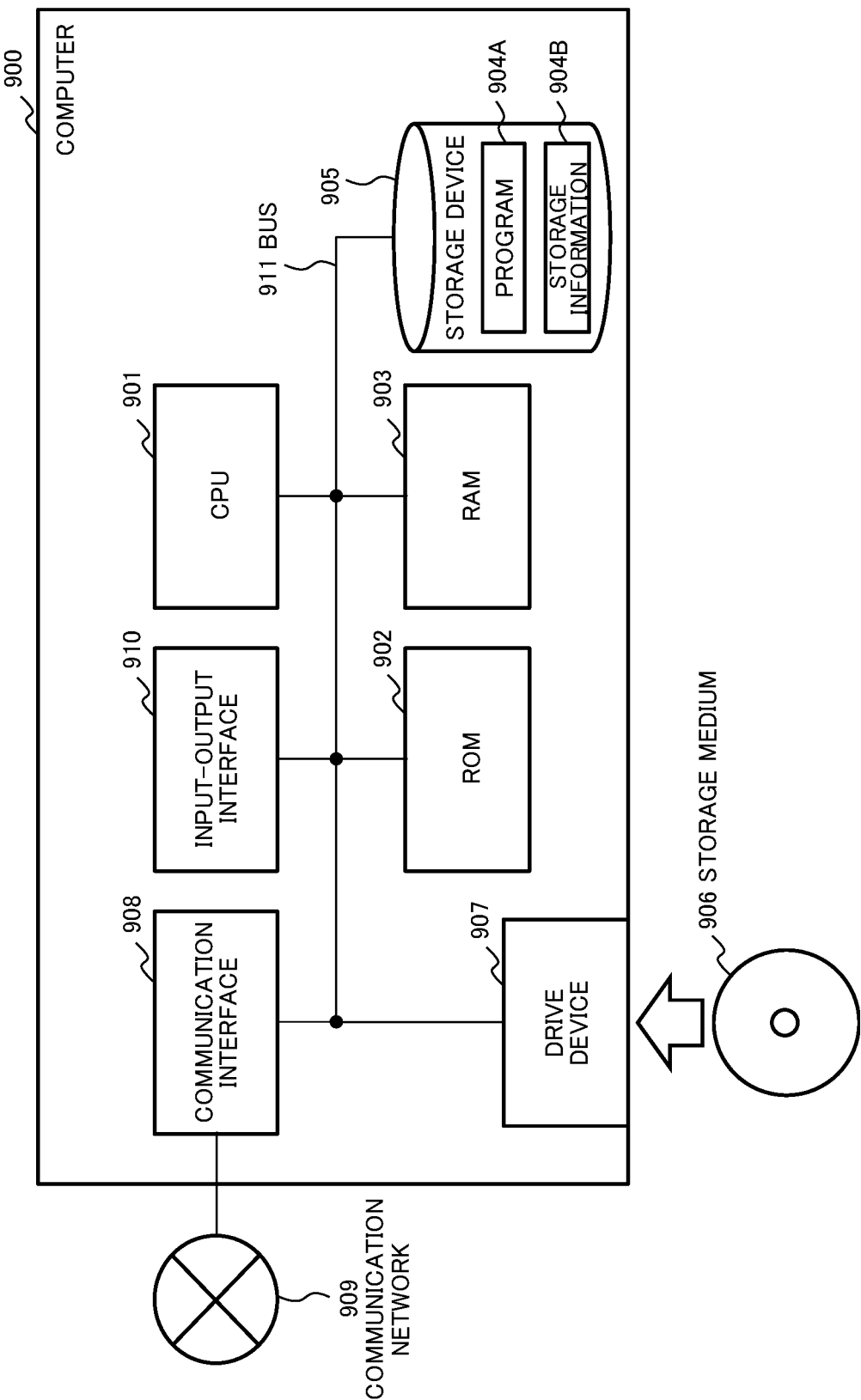
FIG. 22 is a block diagram illustrating an example of hardware constituting each unit of each example embodiment of the present invention.

The "computer system" is a system including a computer 900 as illustrated in FIG. 22 as one example. The computer 900 includes the following configuration.

One or a plurality of central processing units (CPUs) 901
A ROM 902
A random access memory (RAM) 903
A program 904A and storage information 904B loaded into the RAM 903
A storage device 905 that stores the program 904A and the storage information 904B
A drive device 907 that performs reading and writing of a storage medium 906
A communication interface 908 connected to a communication network 909
An input-output interface 910 that inputs and outputs data
A bus 911 that connects components For example, each of the components of each of the devices in each of the example embodiments is achieved by the CPU 901 loading the program 904A that achieves a function of the component into the RAM 903 and executing the program 904A. The program 904A that achieves a function of each of the components of each of the devices is previously stored in the storage device 905 and the ROM 902, for example. Then, the CPU 901 reads the program 904A as necessary. The storage device 905 is, for example, a hard disk. The program 904A may be supplied to the CPU 901 via the communication network 909, or may be previously stored in the storage medium 906, read by the drive device 907, and supplied to the CPU 901. Note that, the storage medium 906 is, for example, a portable medium such as an optical disk, a magnetic disk, a magneto-optical disk, and a non-volatile semiconductor memory.

A method of achieving each of the devices has various modification examples. For example, each of the devices may be achieved by a possible combination of each separate computer 900 and a program, for each component. Alternatively, a plurality of components provided in each of the devices may be achieved by a possible combination of one information processing device 900 and a program.

A part or the whole of each of the components of each of the devices may be achieved by another general-purpose or dedicated circuit, a computer, and the like, or achieved by a combination thereof. A part or the whole of each of the components may be formed by a single chip or formed by a plurality of chips connected to one another via a bus.

When a part or the whole of each of the components of each of the devices is achieved by a plurality of computers, circuits, or the like, the plurality of computers, circuits, or the like may be arranged in a concentrated manner or a distributed manner. For example, the computer, the circuitry, and the like may be realized as a form in which each is connected via a communication network, such as a client server system or a cloud computing system.

A part or the whole of the above-described example embodiments may also be described in supplementary notes below, without being limited thereto.

<<Supplementary Note>>

[Supplementary Note 1]

A storage controller, including:
  a cache processing means for performing cache processing of storing, in a cache storage unit, data stored in a physical disk;
  a setting means for specifying a set of pieces of data that are adjacent to each other in a logical disk and are not adjacent to each other in the physical disk, among data stored in the cache storage unit, and setting a group including the specified set of data;
  a determination means for determining, at an opportunity in which all cached data among data belonging to the group become a target to be deleted from the cache storage unit, a range in the physical disk in which data being the target to be deleted are stored in such a way that all data belonging to the group are continuously arranged in the physical disk; and
  a writing means for writing the data being the target to be deleted into the determined range.

[Supplementary Note 2]

The storage controller according to Supplementary Note 1, wherein
  each piece of the data is data in an individually compressible unit, and
  the writing means individually compresses each piece of data being the target to be deleted, and stores each piece of the compressed data into the determined range.

[Supplementary Note 3]

The storage controller according to Supplementary Note 1 or 2, wherein
  the cache processing means also stores, when the storage controller receives a read request for reading data of a part of data belonging to the group, data that belong to the group and are not a target of the read request in the cache storage unit.

[Supplementary Note 4]

The storage controller according to any one of Supplementary Notes 1 to 3, wherein
  the setting means specifies, when the storage controller receives a read request for reading data that do not belong to any of the groups, data that are stored in the cache storage unit, are adjacent to data being a target of the read request in the logical disk, and are adjacent to the data being the target of the read request in the physical disk, and sets a group including the specified data and the data being the target of the read request.

[Supplementary Note 5]

The storage controller according to any one of Supplementary Notes 1 to 4, wherein
  the cache processing means determines, when the storage controller receives a write request for updating data of a part of data belonging to the group, data to be cached from data included in the group, based on a comparison between a size of data after updating of data being a target of the write request and a size of data before updating of the data being the target of the write request, and caches the determined data.

[Supplementary Note 6]

A storage array device, including:
  the storage controller according to any one of Supplementary Notes 1 to 5;
  a cache storage means for functioning as the cache storage unit; and
  a disk drive that includes the physical disk and in which the logical disk is constructed.

[Supplementary Note 7]

A data storage method, including:
  performing cache processing of storing, in a cache storage unit, data stored in a physical disk;
  specifying a set of pieces of data that are adjacent to each other in a logical disk and are not adjacent to each other in the physical disk, among data stored in the cache storage unit, and setting a group including the specified set of data;
  determining, at an opportunity in which all cached data among data belonging to the group become a target to be deleted from the cache storage unit, a range in the physical disk in which data being the target to be deleted are stored in such a way that all data belonging to the group are continuously arranged in the physical disk; and
  writing the data being the target to be deleted into the determined range.

[Supplementary Note 8]

The data storage method according to Supplementary Note 7, wherein
  each piece of the data is data in an individually compressible and extendable unit, and
  the data storage method further includes individually compressing each piece of data being the target to be deleted, and storing each piece of the compressed data into the determined range.

[Supplementary Note 9]

The data storage method according to Supplementary Note 7 or 8, further including
  also storing, when receiving a read request for reading data of a part of data belonging to the group, data that belong to the group and are not a target of the read request in the cache storage unit.

[Supplementary Note 10]

The data storage method according to any one of Supplementary Notes 7 to 9, further including
  specifying, when receiving a read request for reading data that do not belong to any of the groups, data that are stored in the cache storage unit, are adjacent to data being a target of the read request in the logical disk, and are adjacent to the data being the target of the read request in the physical disk, and setting a group including the specified data and the data being the target of the read request.

[Supplementary Note 11]

The data storage method according to any one of Supplementary Notes 7 to 10, further including determining, when receiving a write request for updating data of a part of data belonging to the group, data to be cached from data included in the group, based on a comparison between a size of data after updating of data being a target of the write request and a size of data before updating of the data being the target of the write request, and caching the determined data.

[Supplementary Note 12]

A computer-readable storage medium that stores a program causing a computer to execute:

cache processing of performing cache processing of storing, in a cache storage unit, data stored in a physical disk;

setting processing of specifying a set of pieces of data that are adjacent to each other in a logical disk and are not adjacent to each other in the physical disk, among data stored in the cache storage unit, and setting a group including the specified set of data;

determination processing of determining, at an opportunity in which all cached data among data belonging to the group become a target to be deleted from the cache storage unit, a range in the physical disk in which data being the target to be deleted are stored in such a way that all data belonging to the group are continuously arranged in the physical disk; and writing processing of writing the data being the target to be deleted into the determined range.

[Supplementary Note 13]

The storage medium according to Supplementary Note 12, wherein each piece of the data is data in an individually compressible and extendable unit, and the writing processing individually compresses each piece of data being the target to be deleted, and stores each piece of the compressed data into the determined range.

[Supplementary Note 14]

The storage medium according to Supplementary Note 12 or 13, wherein the cache processing also stores, when the computer receives a read request for reading data of a part of data belonging to the group, data that belong to the group and are not a target of the read request, in the cache storage unit.

[Supplementary Note 15]

The storage medium according to any one of Supplementary Notes 12 to 14, wherein the setting processing specifies, when the computer receives a read request for reading data that do not belong to any of the groups, data that are stored in the cache storage unit, are adjacent to data being a target of the read request in the logical disk, and are adjacent to the data being the target of the read request in the physical disk, and sets a group including the specified data and the data being the target of the read request.

[Supplementary Note 16]

The storage medium according to any one of Supplementary Notes 12 to 15, wherein the cache processing determines, when the computer receives a write request for updating data of a part of data belonging to the group, data to be cached from data included in the group, based on a comparison between a size of data after updating of data being a target of the write request and a size of data before updating of the data being the target of the write request, and caches the determined data.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-244457, filed on Dec. 20, 2017, the disclosure of which is incorporated herein in its entirety by reference.

REFERENCE SIGNS LIST

31 Storage controller
32 Cache processing unit
33 Setting unit
34 Determination unit
35 Writing unit
100 Host calculator
300 Storage array device
310 Storage controller
311 Cache management unit
312 Compression-extension control unit
313 Write-back unit
320 Disk drive
321 Logical disk
400 Cache storage unit
410 Cache table
500 Control information storage unit
510 Address translation table
520 Discard target management table
530 Adjacent group management table
540 Adjacent group link
800 Physical disk
900 Computer
901 CPU
902 ROM
903 RAM
904A Program
904B Storage information
905 Storage device
906 Storage medium
907 Drive device
908 Communication interface
909 Communication network
910 Input-output interface
911 Bus

What is claimed is:

1. A storage controller, comprising:
at least one memory storing a set of instructions; and
at least one processor configured to execute the set of instructions to:
perform cache processing of storing, in a cache storage, data stored in a physical disk;
specify a set of pieces of data that are adjacent to each other in a logical disk and are not adjacent to each other in the physical disk, among data stored in the cache storage, and set a group including the specified set of data;
determine, at an opportunity in which all cached data among data belonging to the group become a target to be deleted from the cache storage, a range in the physical disk in which data being the target to be deleted are stored in such a way that all data belonging to the group are continuously arranged in the physical disk; and write the data being the target to be deleted into the determined range.

2. The storage controller according to claim 1, wherein each piece of the data is data in an individually compressible unit, and the at least one processor is further configured to execute the set of instructions to individually compress each piece of data being the target to be deleted, and stores each piece of the compressed data into the determined range.

3. The storage controller according to claim 1, wherein the at least one processor is further configured to execute the set of instructions to also store, when the storage controller receives a read request for reading data of a part of data belonging to the group, data that belong to the group and are not a target of the read request, in the cache storage.

4. The storage controller according to claim 1, wherein the at least one processor is further configured to execute the set of instructions to specify, when the storage controller receives a read request for reading data that do not belong to any of the groups, data that are stored in the cache storage, are adjacent to data being a target of the read request in the logical disk, and are adjacent to the data being the target of the read request in the physical disk, and sets a group including the specified data and the data being the target of the read request.

5. The storage controller according to claim 1, wherein the at least one processor is further configured to execute the set of instructions to determine, when the storage controller receives a write request for updating data of a part of data belonging to the group, data to be cached from data included in the group, based on a comparison between a size of data after updating of data being a target of the write request and a size of data before updating of the data being the target of the write request, and caches the determined data.

6. A storage array device, comprising:
the storage controller according to claim 1;
the cache storage; and
a disk drive that includes the physical disk and in which the logical disk is constructed.

7. A data storage method, comprising:
performing cache processing of storing, in a cache storage, data stored in a physical disk;
specifying a set of pieces of data that are adjacent to each other in a logical disk and are not adjacent to each other in the physical disk, among data stored in the cache storage, and setting a group including the specified set of data;
determining, at an opportunity in which all cached data among data belonging to the group become a target to be deleted from the cache storage, a range in the physical disk in which data being the target to be deleted are stored in such a way that all data belonging to the group are continuously arranged in the physical disk; and
writing the data being the target to be deleted into the determined range.

8. The data storage method according to claim 7, wherein each piece of the data is data in an individually compressible unit, and the data storage method further comprises individually compressing each piece of data being the target to be deleted, and storing each piece of the compressed data into the determined range.

9. The data storage method according to claim 7, further comprising also storing, when receiving a read request for reading data of a part of data belonging to the group, data that belong to the group and are not a target of the read request, in the cache storage.

10. The data storage method according claim 7, further comprising specifying, when receiving a read request for reading data that do not belong to any of the groups, data that are stored in the cache storage, are adjacent to data being a target of the read request in the logical disk, and are adjacent to the data being the target of the read request in the physical disk, and setting a group including the specified data and the data being the target of the read request.

11. The data storage method according to claim 7, further comprising determining, when receiving a write request for updating data of a part of data belonging to the group, data to be cached from data included in the group, based on a comparison between a size of data after updating of data being a target of the write request and a size of data before updating of the data being the target of the write request, and caching the determined data.

12. A non-transitory computer-readable storage medium that stores a program causing a computer to execute:
cache processing of storing, in a cache storage, data stored in a physical disk;
setting processing of specifying a set of pieces of data that are adjacent to each other in a logical disk and are not adjacent to each other in the physical disk, among data stored in the cache storage, and setting a group including the specified set of data;
determination processing of determining, at an opportunity in which all cached data among data belonging to the group become a target to be deleted from the cache storage, a range in the physical disk in which data being the target to be deleted are stored in such a way that all data belonging to the group are continuously arranged in the physical disk; and
writing processing of writing the data being the target to be deleted into the determined range.

13. The storage medium according to claim 12, wherein each piece of the data is data in an individually compressible and extendable unit, and the writing processing individually compresses each piece of data being the target to be deleted, and stores each piece of the compressed data into the determined range.

14. The storage medium according to claim 12, wherein the cache processing also stores, when the computer receives a read request for reading data of a part of data belonging to the group, data that belong to the group and are not a target of the read request, in the cache storage.

15. The storage medium according to claim 12, wherein the setting processing specifies, when the computer receives a read request for reading data that do not belong to any of the groups, data that are stored in the cache storage, are adjacent to data being a target of the read request in the logical disk, and are adjacent to the data being the target of the read request in the physical disk, and sets a group including the specified data and the data being the target of the read request.

16. The storage medium according to claim 12, wherein the cache processing determines, when the computer receives a write request for updating data of a part of data belonging to the group, data to be cached from data included in the group, based on a comparison between a size of data after updating of data being a target of the write request and a size of data before updating of the data being the target of the write request, and caches the determined data.

* * * * *